US012763558B2

(12) United States Patent
Gundel et al.

(10) Patent No.: US 12,763,558 B2
(45) Date of Patent: Oct. 13, 2026

(54) ELECTRICAL POWER CABLE PREPARATION SYSTEM

(71) Applicants: 3M Innovative Properties Company, St. Paul, MN (US); Connected Intelligence Systems Ltd., Netanya (IL)

(72) Inventors: Douglas B. Gundel, Cedar Park, TX (US); Udi Blich, Ichud (IL); Eyal Doron, Caesarea (IL); Oded Shoham, Kfar Saba (IL); Assaf Kaufman, Tal Shahar (IL); Uri Bar-Ziv, Zichron Yaakov (IL)

(73) Assignees: 3M Innovative Properties Company, St. Paul, MN (US); Connected Intelligence Systems Ltd., Netanya (IL)

( * ) Notice: Subject to any disclaimer, the term of this patent is extended or adjusted under 35 U.S.C. 154(b) by 149 days.

(21) Appl. No.: 18/807,795

(22) Filed: Aug. 16, 2024

(65) Prior Publication Data

US 2024/0405528 A1 Dec. 5, 2024

Related U.S. Application Data

(63) Continuation of application No. 17/309,774, filed as application No. PCT/US2019/067951 on Dec. 20, 2019, now Pat. No. 12,126,151.

(Continued)

(51) Int. Cl.
*H02G 1/12* (2006.01)

(52) U.S. Cl.
CPC ........... *H02G 1/1265* (2013.01); *H02G 1/127* (2013.01)

(58) Field of Classification Search
CPC .... H02G 1/1265; H02G 1/127; H02G 1/1248; H02G 1/1268; H02G 1/1202

(Continued)

(56) References Cited

U.S. PATENT DOCUMENTS 2,474,275 A 6/1949 Manuel et al.
3,128,658 A 4/1964 Mitchell et al.

(Continued)

FOREIGN PATENT DOCUMENTS

CH 641278 A5 2/1984
CN 1161763 A 10/1997

(Continued)

OTHER PUBLICATIONS

Communication pursuant to Article 94(3) EPC from counterpart European Application No. 19839751.5 dated Jun. 18, 2025, 9 pp.

(Continued)

*Primary Examiner* — Phong H Nguyen
(74) *Attorney, Agent, or Firm* — Shumaker & Sieffert, P.A.

(57) ABSTRACT

Techniques, systems and articles are described for preparing electrical cables for connections to a power grid. In one example, a system includes a cable preparation device configured to cut one or more layers of an electrical cable and a computing device configured to control the cable preparation device to cut the one or more layers of the electrical cable. The computing device may determine one or more target cutting distances and determine whether an actual cutting distance satisfies the target cutting distance. The computing device may detect defects in the electrical cable. The computing device may further determine whether the cable preparation device should be serviced.

19 Claims, 21 Drawing Sheets

Related U.S. Application Data

(60) Provisional application No. 62/784,214, filed on Dec. 21, 2018.

(58) Field of Classification Search
USPC .......................................... 81/9.4, 9.51, 9.41
See application file for complete search history.

(56) References Cited

U.S. PATENT DOCUMENTS

| | | | |
|---|---|---|---|
| 3,601,891 | A | 8/1971 | Destito |
| 3,820,420 | A | 6/1974 | Matthews |
| 4,301,399 | A | 11/1981 | Miller et al. |
| 4,321,643 | A | 3/1982 | Vernier |
| 4,345,362 | A | 8/1982 | de Givry |
| 4,424,480 | A | 1/1984 | Stefan |
| 4,546,675 | A | 10/1985 | Okada et al. |
| 4,745,828 | A | 5/1988 | Stepan |
| 4,769,910 | A | 9/1988 | Noon |
| 4,802,512 | A | 2/1989 | Kodera |
| 4,869,135 | A | 9/1989 | Hoffa |
| 5,038,457 | A | 8/1991 | Yasushi et al. |
| 5,243,882 | A | 9/1993 | Stepan |
| 5,272,941 | A | 12/1993 | English et al. |
| 5,323,117 | A | 6/1994 | Endoh et al. |
| 5,502,374 | A | 3/1996 | Cota |
| 5,515,609 | A | 5/1996 | Sperti |
| 5,617,859 | A | 4/1997 | Souza et al. |
| 5,691,763 | A | 11/1997 | Ichikawa et al. |
| 5,756,972 | A | 5/1998 | Vranicar et al. |
| 5,781,984 | A | 7/1998 | Koch et al. |
| 5,892,430 | A | 4/1999 | Wiesman et al. |
| 5,936,725 | A | 8/1999 | Pike et al. |
| 6,176,155 | B1 | 1/2001 | Palmowski et al. |
| 6,286,393 | B1 | 9/2001 | Messer et al. |
| 6,330,839 | B1 | 12/2001 | Amrein |
| 6,617,859 | B1 | 9/2003 | Orton |
| 6,734,662 | B1 | 5/2004 | Fenske |
| 6,739,055 | B2 | 5/2004 | Lee |
| 7,166,804 | B2 | 1/2007 | Yumura et al. |
| 8,600,700 | B2 | 12/2013 | Vogel et al. |
| 8,643,380 | B1 | 2/2014 | Herbert |
| 9,917,434 | B2 | 3/2018 | George et al. |
| 9,961,418 | B2 | 5/2018 | Rodriguez et al. |
| 10,192,678 | B2 | 1/2019 | Koo et al. |
| 10,338,103 | B2 | 7/2019 | Gravermann et al. |
| 10,811,856 | B2 | 10/2020 | Symington et al. |
| 11,381,061 | B2 | 7/2022 | Symington et al. |
| 12,062,891 | B2 | 8/2024 | Gundel et al. |
| 2005/0050713 | A1 | 3/2005 | Locher et al. |
| 2005/0099636 | A1 | 5/2005 | Schweser |
| 2006/0260133 | A1 | 11/2006 | Goop |
| 2007/0204731 | A1 | 9/2007 | Merle |
| 2009/0049697 | A1 | 2/2009 | Williams |
| 2010/0114392 | A1 | 5/2010 | Lancaster |
| 2010/0308797 | A1 | 12/2010 | Zimmermann |
| 2012/0047724 | A1 | 3/2012 | Yano et al. |
| 2012/0192414 | A1 | 8/2012 | Montena et al. |
| 2012/0199392 | A1 | 8/2012 | Samuelson et al. |
| 2012/0203493 | A1 | 8/2012 | Dobson et al. |
| 2012/0268106 | A1 | 10/2012 | Blake, Jr. et al. |
| 2012/0306510 | A1 | 12/2012 | White et al. |
| 2013/0054162 | A1 | 2/2013 | Smith et al. |
| 2014/0368215 | A1 | 12/2014 | Hoffman et al. |
| 2015/0062328 | A1 | 3/2015 | Lauffer et al. |
| 2015/0089815 | A1 | 4/2015 | Woodward |
| 2015/0120218 | A1 | 4/2015 | Garnacho Vecino et al. |
| 2015/0128399 | A1 | 5/2015 | Meierhans et al. |
| 2015/0287180 | A1 | 10/2015 | Frey |
| 2016/0054363 | A1 | 2/2016 | Rostron et al. |
| 2016/0091533 | A1 | 3/2016 | Soleillant et al. |
| 2016/0139181 | A1 | 5/2016 | Gravermann et al. |
| 2016/0225248 | A1 | 8/2016 | Rodriguez, Jr. et al. |
| 2017/0012412 | A1 | 1/2017 | Symington et al. |
| 2017/0222420 | A1 | 8/2017 | Dhlamini |
| 2017/0310092 | A1 | 10/2017 | Viviroli |
| 2017/0343336 | A1 | 11/2017 | Lettau et al. |
| 2017/0346265 | A1 | 11/2017 | Soerensen |
| 2018/0017611 | A1 | 1/2018 | Radun et al. |
| 2018/0059162 | A1 | 3/2018 | Leblanc et al. |
| 2018/0062370 | A1 | 3/2018 | Heidmann et al. |
| 2018/0238955 | A1 | 8/2018 | Bango et al. |
| 2018/0252760 | A1 | 9/2018 | Andle et al. |
| 2018/0328531 | A1 | 11/2018 | Weisenberg et al. |
| 2019/0128927 | A1 | 5/2019 | Shaw et al. |
| 2019/0293706 | A1 | 9/2019 | Sohn et al. |
| 2019/0369152 | A1 | 12/2019 | Fallet et al. |
| 2019/0393685 | A1 | 12/2019 | Sedlacek |
| 2020/0076173 | A1 | 3/2020 | Houser et al. |
| 2021/0273426 | A1 | 9/2021 | Khu et al. |
| 2022/0029395 | A1 | 1/2022 | Gundel et al. |
| 2022/0045491 | A1 | 2/2022 | Gundel et al. |
| 2022/0060002 | A1 | 2/2022 | Gundel et al. |
| 2023/0023163 | A1 | 1/2023 | Gundel et al. |
| 2024/0405528 | A1 | 12/2024 | Gundel et al. |

FOREIGN PATENT DOCUMENTS

| | | | |
|---|---|---|---|
| CN | 1530965 | A | 9/2004 |
| CN | 1601659 | A | 3/2005 |
| CN | 101666849 | A | 3/2010 |
| CN | 102116824 | A | 7/2011 |
| CN | 102313861 | A | 1/2012 |
| CN | 102623871 | A | 8/2012 |
| CN | 202373838 | U | 8/2012 |
| CN | 202978201 | U | 6/2013 |
| CN | 103339813 | A | 10/2013 |
| CN | 103560441 | A | 2/2014 |
| CN | 104407270 | A | 3/2015 |
| CN | 104518393 | A | 4/2015 |
| CN | 204256093 | U | 4/2015 |
| CN | 104821521 | A | 8/2015 |
| CN | 104849628 | A | 8/2015 |
| CN | 104979740 | A | 10/2015 |
| CN | 105043457 | A | 11/2015 |
| CN | 204988364 | U | 1/2016 |
| CN | 205175574 | U | 4/2016 |
| CN | 205263241 | U | 5/2016 |
| CN | 105629136 | A | 6/2016 |
| CN | 105699860 | A | 6/2016 |
| CN | 105811328 | A | 7/2016 |
| CN | 205509462 | U | 8/2016 |
| CN | 106025940 | A | 10/2016 |
| CN | 106124948 | A | 11/2016 |
| CN | 205719288 | U | 11/2016 |
| CN | 106353648 | A | 1/2017 |
| CN | 106451253 | A | 2/2017 |
| CN | 206038828 | U | 3/2017 |
| CN | 206135313 | U | 4/2017 |
| CN | 106646156 | A | 5/2017 |
| CN | 106771933 | A | 5/2017 |
| CN | 206147041 | U | 5/2017 |
| CN | 106855443 | A | 6/2017 |
| CN | 106950477 | A | 7/2017 |
| CN | 106980075 | A | 7/2017 |
| CN | 107306021 | A | 10/2017 |
| CN | 206685810 | U | 11/2017 |
| CN | 107453188 | A | 12/2017 |
| CN | 108169644 | A | 6/2018 |
| CN | 108376884 | A | 8/2018 |
| CN | 207765893 | U | 8/2018 |
| CN | 108941386 | A | 12/2018 |
| DE | 2928727 | A1 | 2/1981 |
| DE | 3025819 | A1 | 2/1982 |
| DE | 3702735 | A1 | 8/1988 |
| DE | 20117063 | U1 | 1/2002 |
| DE | 202008017358 | U1 | 8/2009 |
| DE | 102011079935 | A1 | 1/2013 |
| EP | 1902498 | A1 | 3/2008 |
| EP | 2472688 | A2 | 7/2012 |
| EP | 2579055 | A1 | 4/2013 |
| EP | 2806277 | A1 | 11/2014 |
| EP | 2818881 | A1 | 12/2014 |
| EP | 3002594 | A1 | 4/2016 |
| EP | 3109958 | A1 | 12/2016 |

(56) References Cited

FOREIGN PATENT DOCUMENTS

| | | | |
|---|---|---|---|
| EP | 3182428 | A1 | 6/2017 |
| EP | 3900132 | A1 | 4/2025 |
| FR | 2282179 | A1 | 3/1976 |
| FR | 2920922 | A1 | 3/2009 |
| GB | 2288696 | A | 10/1995 |
| GB | 2463689 | A | 3/2010 |
| GB | 2542939 | A | 4/2017 |
| JP | S60256068 | A | 12/1985 |
| JP | H03273809 | A | 12/1991 |
| JP | H06160459 | A | 6/1994 |
| JP | H06308191 | A | 11/1994 |
| JP | H09182237 | A | 7/1997 |
| JP | H10201070 | A | 7/1998 |
| JP | H11258169 | A | 9/1999 |
| JP | 2004156910 | A | 6/2004 |
| JP | 2012026890 | A | 2/2012 |
| JP | 2015104274 | A | 6/2015 |
| KR | 101317476 | B1 | 10/2013 |
| KR | 101847456 | B1 | 4/2018 |
| WO | 9840756 | | 9/1998 |
| WO | 0042444 | | 7/2000 |
| WO | 2006100590 | A1 | 9/2006 |
| WO | 2007052095 | A1 | 5/2007 |
| WO | 2008072226 | A2 | 6/2008 |
| WO | 2012130816 | A1 | 10/2012 |
| WO | 2014129817 | A1 | 8/2014 |
| WO | 2015179102 | A1 | 11/2015 |
| WO | 2016010314 | A1 | 1/2016 |
| WO | 2016019666 | A1 | 2/2016 |
| WO | 2016058721 | A1 | 4/2016 |
| WO | 2016088174 | A1 | 6/2016 |
| WO | 2016088175 | A1 | 6/2016 |
| WO | 2016137424 | A1 | 9/2016 |
| WO | 2016177571 | A2 | 10/2016 |
| WO | 2016187090 | A1 | 11/2016 |
| WO | 2018087337 | A1 | 5/2018 |
| WO | 2020132502 | A1 | 4/2025 |

OTHER PUBLICATIONS

Office Action from counterpart Canadian Application No. 3,124,643 dated May 9, 2025, 3 pp.
Communication pursuant to Article 94(3) EPC from counterpart European Application No. 19839751.5 dated Sep. 21, 2023, 9 pp.
Examiner's Report from counterpart Canadian Application No. 3,124,643 dated Apr. 4, 2023, 4 pp.
Examiner's Report from counterpart Canadian Application No. 3,124,643 dated Sep. 27, 2022, 4 pp.
First Office Action and Search Report, and translation thereof, from counterpart Chinese Application No. 201980090980.X dated Jun. 21, 2022, 15 pp.
International Preliminary Report on Patentability from International Application No. PCT/US2019/067951, dated Jul. 1, 2021, 12 pp.
International Search Report and the Written Opinion from International application No. PCT/US2019/067951 dated Apr. 1, 2020, 18 pgs.
Notice of Intent to Grant, and translation thereof, from counterpart Chinese Application No. 201980090980.X, dated Mar. 29, 2023, 4 pp.
Office Action from counterpart Canadian Application No. 3,124,643 dated Apr. 4, 2023, 4 pp.
Office Action from counterpart Canadian Application No. 3,124,643 dated Feb. 21, 2024, 4 pp.
Prosecution History from U.S. Appl. No. 17/309,774, dated Jun. 17, 2021 through Aug. 7, 2024, 84 pp.
Response to Communication pursuant to Article 94(3) EPC dated Sep. 21, 2023, from counterpart European Application No. 19839751.5 filed Jan. 29, 2024, 18 pp.
Response to Examiner's Report dated Feb. 21, 2024, from counterpart Canadian Application No. 3,124,643 filed Jun. 13, 2024, 19 pp.
Response to Examiner's Report dated Sep. 27, 2022, from counterpart Canadian Application No. 3,124,643 filed Nov. 10, 2022, 23 pp.
Response to Office Action dated Apr. 4, 2023, from counterpart Canadian Application No. 3,124,643 filed Jul. 27, 2023, 19 pp.
Response to Office Action dated Aug. 26, 2022, from counterpart Chinese Application No. 201980090980.X filed Sep. 28, 2022, 64 pp.
Response to Office Action dated Jun. 21, 2022, from counterpart Chinese Application No. 201980090980.X filed Aug. 15, 2022, 10 pp.
Response to Office Action dated Oct. 27, 2022, from counterpart Chinese Application No. 201980090980.X filed Jan. 4, 2023, 15 pp.
Second Office Action and Search report, and translation thereof, from counterpart Chinese Application No. 201980090980.X dated Aug. 26, 2022, 16 pp.
Third Office Action, and translation thereof, from counterpart Chinese Application No. 201980090980.X dated Oct. 27, 2022, 11 pp.
U.S. Appl. No. 17/309,690, filed Jun. 15, 2021 naming inventors Gundel et al.
U.S. Appl. No. 17/309,755, filed Jun. 17, 2021, naming inventors Gundel et al.
U.S. Appl. No. 17/309,773, filed Jun. 17, 2021, naming inventors Gundel et al.
U.S. Appl. No. 17/309,774, filed Jun. 17, 2021, naming inventors Gundel et al.
U.S. Appl. No. 17/757,916, filed Nov. 30, 2020, naming inventors Gundel et al.
Van Der Wielen, "Synchronization of online PD detection and localization setups using pulse injection", Proceedings of the 7th International Conference on Properties and Applications of Dielectric Materials, vol. 01, IEEE, Jun. 2003, pp. 327-330.
Wang et al., "Calibration of capacitive couplers for online PD detection in HV cables", IEEE Electrical Insulation Magazine, vol. 11, No. 03, IEEE, May 2005, pp. 28-39.
Response to Communication pursuant to Article 94(3) EPC dated Jun. 18, 2025, from counterpart European Application No. 19839751.5 filed Oct. 10, 2025, 129 pp.
Notice of Allowance from U.S. Appl. No. 17/309,774 dated Aug. 28, 2024, 9 pp.
Office Action, and translation thereof, from counterpart Brazilian Application No. 1120210120939 dated Apr. 3, 2025, 7 pp.
Unfavorable Opinion from counterpart Application No. 1120210120939 dated May 12, 2026, 9 pp.
Unfavorable Opinion from counterpart Application No. 1220250140155 dated May 26, 2026, 15 pp.

ELECTRICAL POWER CABLE PREPARATION SYSTEM

This application is a continuation of U.S. patent application Ser. No. 17/309,774, filed 17 Jun. 2021, which is a national stage of International Patent Application No. PCT/US2019/067951, filed 20 Dec. 2019, which claims the benefit of U.S. Provisional Patent Application No. 62/784,214, filed 21 Dec. 2018, the entire content of each application is incorporated herein by reference.

TECHNICAL FIELD

The present disclosure relates to the field of electrical equipment, including power cables and accessories, for power utilities.

BACKGROUND

Electrical power grids include numerous components that operate in diverse locations and conditions, such as above ground, underground, cold weather climates, hot weather climates, etc. When a power grid suffers a failure, it can be difficult to determine the cause of the failure. For example, a power grid may include hundreds or thousands of discrete components, such as transformers, cables, cable splices, etc., and a failure in the power grid may be caused by a failure in any single component or a collection of the components. The root cause of such failures may include human error in installation, manufacturing defects, or wear and tear on the component, among other causes. While replacement of the electrical components can be costly, simply finding the fault can be time consuming and expensive. If a component fails in service, the total cost can include downtime for customer operations, liability, safety, or regulatory scrutiny, in addition to the actual costs incurred to locate and replace faulty components. Further, faulty components may pose a safety risk to utility workers, civilians, homes, buildings, or other infrastructure.

SUMMARY

The present disclosure provides techniques for preparing electrical cables to connect to cable accessories for use in a power grid. According to examples of this disclosure, a system includes a cable preparation device configured to cut one or more layers of an electrical cable and a computing device (e.g., one or more processors) configured to control the cable preparation device to automatically cut the one or more layers of the electrical cable for coupling the electrical cable to a cable accessory (e.g., a cable splice body or a termination). In one example, the computing device determines a target cutting depth and a target cutback length associated with one or more respective layers of the electrical cable. The computing device determines whether an actual cutting depth and/or cutback length satisfies the target cutting depth and/or cutback length, respectively. In some examples, the computing device detects defects in the electrical cable. In another example, the computing device determines whether the cable preparation device should be serviced.

In this way, the computing device may enable a cable preparation device to prepare an electrical cable faster and control the cutting depth and cutback length of cuts to one or more layers of an electrical cable more accurately than other techniques. Cutting the layers of the electrical cable more accurately may reduce defects in the electrical cable (e.g., in a cable splice). For example, cutting the layers more accurately may reduce air voids, and hence the decrease the probability and/or quantity of partial discharge events. Reducing the probability and/or quantity of partial discharge events may decrease the probability of failure events of the electrical cable and increase the life expectancy of the electrical cable. Reducing the probability of failure events may increase the reliability of the power grid. Further, increasing life expectancy of the electrical cable may decrease costs of constructing, operating, and maintaining the power grid.

The details of one or more examples of the disclosure are set forth in the accompanying drawings and the description below. Other features, objects, and advantages of the disclosure will be apparent from the description and drawings, and from the claims.

It is to be understood that the embodiments may be utilized, and structural changes may be made, without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
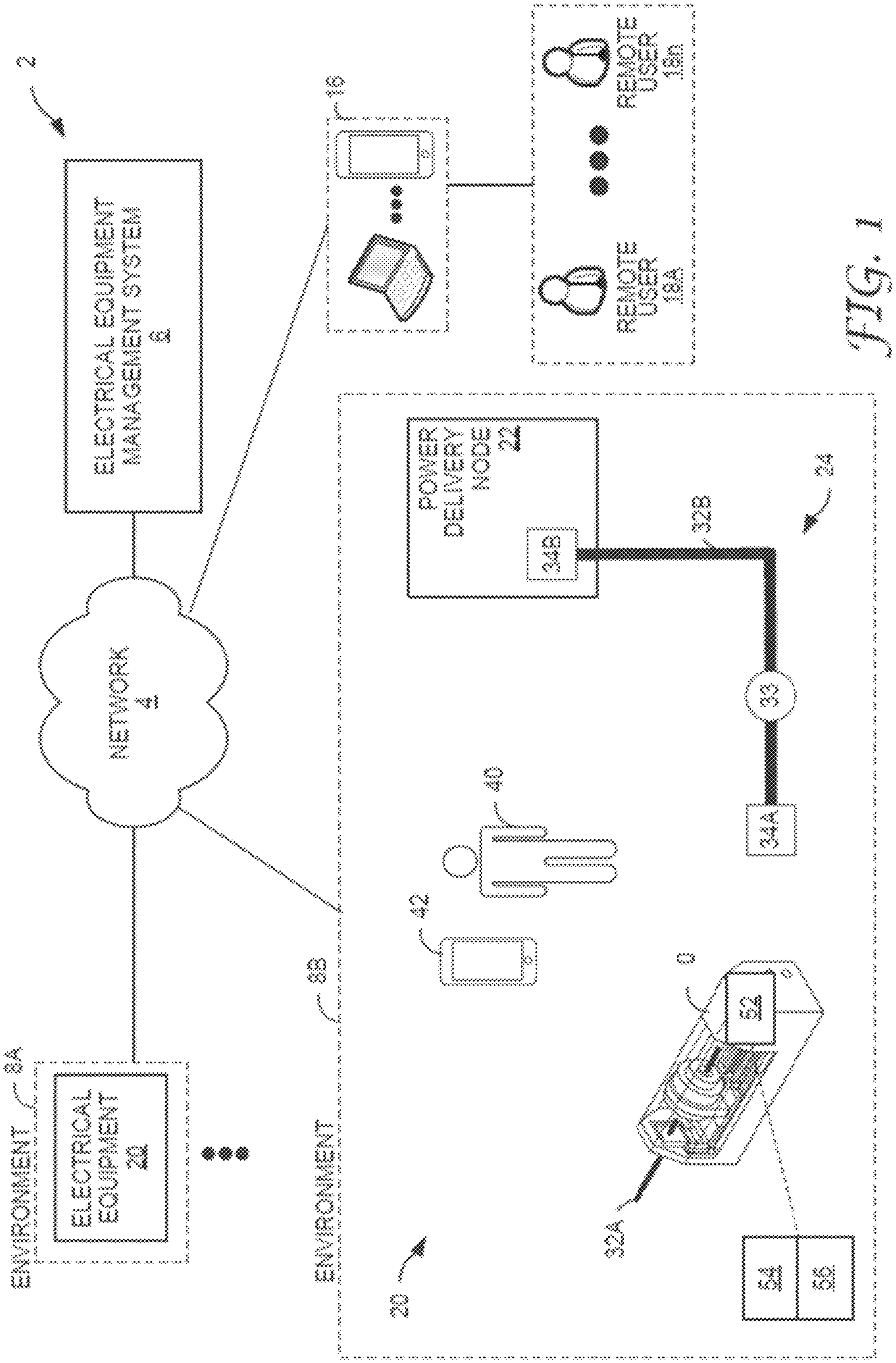
FIG. 1 is a block diagram illustrating an example system for preparing electrical cables for use within an electrical power grid, in accordance with various techniques of this disclosure.

FIG. 1 is a block diagram illustrating an example system 2 for automatically preparing electrical cables for use within an electrical power grid. In the example of FIG. 1, system 2 includes an electrical equipment management system (EEMS) 6 and one or more environments 8A and 8B (collectively, environments 8) that include electrical equipment 20 (e.g., electrical cables 32 of power lines 24 and cable preparation device 50). As described herein, EEMS 6 may exchange information with cable preparation device 50 to enable cable preparation device 50 to efficiently and accurately prepare electrical cables 32 for installation within a power grid.

In general, EEMS 6 can provide one or more of data acquisition, monitoring, activity logging, data storage, reporting, predictive analytics, and alert generation. Moreover, EEMS 6 may provide information to cable preparation device 50 to enable cable preparation device 50 to cut various layers of electrical cables 32 and store information associated with electrical cables 32 that are prepared by cable preparation device 50 (e.g., images of the prepared electrical cables, date and/or location of the installation of the prepared electrical cables, amount of time used to prepare and install the prepared electrical cables 32, etc.). In addition, EEMS 6 may include an underlying analytics engine for predicting failure events of electrical cables 32 and an alerting system, in accordance with various examples described herein. In general, a failure event may refer to interruption of electrical power delivery between an electrical power source and an electrical power consumer, for example, caused by deterioration or breakage of an article of electrical equipment (e.g., a cable splice).

As further described below, EEMS 6 may include an integrated suite of electrical equipment management tools and implements various techniques of this disclosure. That is, EEMS 6 provides a system for managing electrical equipment (e.g., electrical cables, splices, transformers, etc.) within one or more physical environments 8, which may be cities, neighborhoods, buildings, construction sites, or any physical environment. In some examples, the environments 8 may include environments that are not communicatively coupled via network 4 to EEMS 6, other environment, or other computing devices 16. The techniques of this disclosure may be realized within various parts of system 2.

As shown in the example of FIG. 1, system 2 represents a computing environment in which a computing device within of a plurality of physical environments 8 electronically communicate with EEMS 6 via one or more computer networks 4. Each of physical environment 8 represents a physical environment in which one or more electrical power lines 24 provide power from a power source (e.g., power plant) to one or more consumers (e.g., businesses, homes, government facilities, etc.).

In this example, environment 8A is shown as generally as having electrical equipment 20, while environment 8B is shown in expanded form to provide a more detailed example. In the example of FIG. 1, includes a plurality of articles of electrical equipment 20, such as one or more power delivery nodes 22, one or more power lines 24, and one or more cable preparation devices 50.

In the example of FIG. 1, environment 8B includes one or more workers 40 that may utilize one or more computing devices 42. Computing devices 42 may be communicatively coupled to EEMS 6 and/or computing device 52 of cable preparation device 50 via wired and/or wireless communication. For example, computing devices 42 and/or 52 may include a cellular radio (e.g., GSM, CDMA, LTE, etc.), Bluetooth® radio, WiFi® radio, low power wide area network (LPWAN), etc. As another example, computing devices 42 and 52 may include a wired connection, such as a network interface card (e.g. such as an Ethernet card), an optical transceiver, or any other type of device that can send and/or receive data.

Power delivery nodes 22 may include one or more input lines to receive power (e.g., directly from a power source or indirectly via another power delivery node 22) and one or more output lines to directly or indirectly (e.g., via another power delivery node 22) distribute power to consumers (e.g., homes, businesses, etc.). Power delivery nodes 22 may include a transformer to step voltages up or down. In some examples, power delivery node 22A may be a relatively small node to distribute power to homes in a neighborhood, such as an electrical cabinet, pole-mount transformer, or pad-mount transformer. As another example, power delivery node 22 may be a relatively large node (e.g., a transmission substation) that distributes power to other power delivery nodes (e.g., distribution substations), such that the other power delivery nodes further distribute power to consumers (e.g., homes, businesses, etc.).

Power lines 24 may transmit electrical power from a power source (e.g., a power plant) to a power consumer, such as a business or home. Power lines 24 may be underground, underwater, or suspended overhead (e.g., from wooden poles, metal structures, etc.). Power lines 24 may be used for electrical power transmission at relatively high voltages (e.g., compared to electrical cables utilized within a home, which may transmit electrical power between approximately 12 volts and approximately 240 volts depending on application and geographic region). For example, power lines 24 may transmit electrical power above approximately 600 volts (e.g., between approximately 600 volts and approximately 1,000 volts). However, it should be understood that power lines 24 may transmit electrical power over any voltage and/or frequency range. For example, lines 24 may transmit electrical power within different voltage ranges. In some examples, a first type of lines 24 may transmit voltages of more than approximately 1,000 volts, such as for distributing power between a residential or small commercial customer and a power source (e.g., power utility). As another example, a second type of lines 24 may transmit voltages between approximately 1 kV and approximately 69 kV, such as for distributing power to urban and rural communities. A third type of lines 24 may transmit voltages greater than approximately 69 kV, such as for sub-transmission and transmission of bulk quantities of electric power and connection to very large consumers.

Power lines 24 include electrical cables 32A-32B (collectively, electrical cables 32) and one or more electrical cable accessories 34A-34B (collectively, cable accessories 34). Electrical cables 32 may also be referred to as electrical power cables, power cables, or cables. Each electrical cable 32 includes a conductor which may be radially surrounded by one or more layers of insulation. In some examples, electrical cables 32 include a plurality of stranded conductors (e.g., a three-phase or multi-conductor cable). Example cable accessories 34 may include splices, separable connectors, terminations, and connectors, among others. In some examples, cable accessories 34 may include cable splices configured to couple (e.g., electrically and physically) two or more electrical cables 32. For example, as shown FIG. 1, cable accessory 34A is configured to electrically and physically couple cable 32A to cable 32B. In some examples, terminations may be configured to couple (e.g., electrically and physically) a cable 32 to additional electrical equipment, such as a transformer, switch gear, power substation, business, home, or other structure. For example, as shown FIG. 1, cable accessory 34B electrically and physically couple cable 32B to power delivery node 22 (e.g., to a transformer of the power delivery node 22).

System 2 may include one or more electrical cable monitoring devices 33 configured to monitor one or more conditions of an article of electrical equipment 20. For example, monitoring devices 33 may be configured to monitor conditions of power delivery nodes 22, electrical cables 32, cable accessories 34, or other type of electrical equipment 20. Monitoring devices 33 may be configured to attach or otherwise couple to electrical cables 32 and/or cable accessories 34. In some examples, monitoring devices 33 may be integrated within another device, such as cable accessories 34, or may be a separate (e.g., stand-alone) device. Example details of monitoring devices and electrical equipment management systems are described in U.S. Patent Application 62/729,367, entitled "ELECTRICAL POWER CABLE MANAGEMENT SYSTEM HAVING ANALYTICS ENGINE WITH INTEGRATED MONITORING, ALERTING, AND PRE-FAULT EVENT PREDICTION," filed Sep. 10, 2018, and in U.S. Patent Application 62/729,325, entitled "ELECTRICAL POWER CABLE MONITORING DEVICE USING LOW SIDE ELECTRODE AND EARTH GROUND SEPARATION," filed Sep. 10, 2018, which are hereby incorporated by reference in its entirety. Example details of monitoring devices having a protective shell are described in U.S. Patent Application 62/729,320, entitled "SUPPORT STRUCTURE FOR CABLE AND CABLE ACCESSORY CONDITION MONITORING DEVICES,' filed Sep. 10, 2018, which is hereby incorporated by reference in its entirety. Further example details of monitoring devices for sensing partial discharge events are described in U.S. Patent Application 62/729,363, entitled "ELECTRICAL POWER CABLE MONITORING DEVICE INCLUDING PARTIAL DISCHARGE SENSOR," filed Sep. 10, 2018, which is hereby incorporated by reference in its entirety.

System 2 includes computing devices 16 by which users 18A-18N (collectively, users 18) may interact with EEMS 6 via network 4. For purposes of example, the end-user computing devices 16 may be laptops, desktop computers, mobile devices such as tablets, smart phones, and the like.

Users 18 interact with EEMS 6 to control and actively manage many aspects of electrical equipment 20, such as accessing and viewing event records, analytics, and reporting. For example, users 18 may review event data acquired and stored by EEMS 6. In addition, users 18 may interact with EEMS 6 to perform asset tracking and to schedule maintenance or replacement for individual pieces of electrical equipment 20, e.g., monitoring devices 33, electrical cables 32 and/or cable accessories 34. EEMS 6 may allow users 18 to create and complete digital checklists with respect to the maintenance and/or replacement procedures and to synchronize any results of the procedures from computing devices 16 to EEMS 6.

Further, as described herein, EEMS 6 integrates an event processing platform configured to process hundreds, thousands, or even millions of concurrent streams of events from monitoring devices 33 that monitor respective articles of electrical equipment 20 (e.g., cable accessories 34). An underlying analytics engine of EEMS 6 applies historical data and models to the inbound streams to compute assertions, such as identified anomalies or predicted occurrences of failure events based on data from sensors of electrical equipment 20. Further, EEMS 6 provides real-time alerting and reporting to notify users 18 of any predicted events, anomalies, trends, and the like.

The analytics engine of EEMS 6 may, in some examples, apply analytics to identify relationships or correlations between sensor data, environmental conditions, geographic regions, or other factors and analyze the impact on failure events. In some examples, EEMS 6 may determine a health of one or more cables accessories 34 or other electrical equipment. For example, EEMS 6 may determine, based on the data acquired across populations of electrical equipment 20, circumstances that lead to, or are predicted to lead to, failure events.

In some examples, EEMS 6 may determine whether an article of electrical equipment 20 should be repaired or replaced, prioritize maintenance (e.g., repair or replacement) procedures, create work orders, assign individuals or crews to perform the maintenance procedures, etc. EEMS 6 may, according to some examples, recommend re-routing electrical power or automatically re-route electrical power based on the analysis results.

EEMS 6 may process data for one or more entities, such as power utilities. For example, EEMS 6 may receive event data from electrical equipment of a single power utility and may provide analytics and reporting for the single power utility. As another example, EEMS 6 may receive event data from multiple power utilities and provide analytics and reporting for each of the power utilities. By receiving data from multiple power utilities, EEMS 6 may provide more robust prediction capabilities, for example, by training machine learning models with a larger data set than individual power utilities each utilizing a separate EEMS 6.

In this way, EEMS 6 integrates comprehensive tools for managing electrical equipment 20 with an underlying analytics engine and communication system to provide data acquisition, monitoring, activity logging, reporting, and alert generation. Moreover, EEMS 6 provides a communication system for operation and utilization by and between the various elements of system 2. Users 18 may access EEMS 6 to view results on any analytics performed by EEMS 6 on data acquired from monitoring devices 33. In some examples, EEMS 6 may present a web-based interface via a web server (e.g., an HTTP server) or client-side applications may be deployed for computing devices 16 used by users 18.

In some examples, EEMS 6 may provide a database query engine for directly querying EEMS 6 to view acquired event (e.g., sensor) data and any results of the analytic engine, e.g., by the way of dashboards, alert notifications, reports, and the like. That is, users 18, or software executing on computing devices 16, may submit queries to EEMS 6 and receive data corresponding to the queries for presentation in the form of one or more reports or dashboards. Such dashboards may provide various insights regarding system 2, such as baseline ("normal") operation across environments 8, identifications of any anomalous environments and/or electrical equipment 20, identifications of any geographic regions within environments 2 for which unusual activity (e.g., failure events) has occurred or is predicted to occur, and the like.

As illustrated in detail below, EEMS 6 may simplify workflows for individuals charged with monitoring electrical equipment 20 for an entity or environment. That is, the techniques of this disclosure may enable active electrical equipment management and allow an organization to take preventative or correction actions with respect to particular pieces of electrical equipment.

As one example, the underlying analytical engine of EEMS 6 may be configured to compute and present metrics for electrical equipment within a given environment 8 or across multiple environments for an organization. For example, EEMS 6 may be configured to acquire data and provide aggregated failure metrics and predicted failure analytics across one or more environments 8. Furthermore, users 18 may set benchmarks for occurrence of any failure events, and EEMS 6 may track actual failure events relative to the benchmarks.

As another example, EEMS 6 may further trigger an alert if certain combinations of conditions are present, e.g., to accelerate examination or service of one or more articles of electrical equipment 20, such as one of cable accessories 34. In this manner, EEMS 6 may identify an individual article of electrical equipment 20 predicted to fail and prompt users 18 to inspect and/or replace the article of electrical equipment prior to failure of the article.

EEMS 6 may be communicatively coupled to cable preparation device 50. In one example, as described further below, EEMS 6 may provide information to cable preparation device 50 to enable cable preparation device 50 to cut various layers of electrical cables 32. For instance, EEMS 6 may store information for different types electrical cables 32, such as the depth of each layer of a respective type of electrical cable 24, and may provide such information to cable preparation device 50 for cutting the layers of electrical cables 32. As another example, EEMS 6 may store information associated with electrical cables 32 that are prepared by cable preparation device 50, such as a date and location when the electrical cable 32 was prepared and installed, amount of time used to prepare and install the prepared electrical cables 32, images of the electrical cable 32 during and/or after the preparation and installation, etc.).

Cable preparation device 50 is configured to automatically cut one or more layers of electrical cable 32A to prepare electrical cable 32A for coupling to a cable accessory (e.g., cable accessory 34A). In some examples, cable preparation device 50 may include any one or more of the cable preparation devices described in U.S. Provisional Patent Application No. 62/784,214, entitled "ELECTRICAL POWER CABLE PREPARATION SYSTEM", and filed on May 10, 2019, the entire content of which is incorporated herein by reference. Cable preparation device 50 may be configured to automatically remove various layers (e.g., a cable jacket layer, a shield layer, an insulation layer, an insulation screen layer, a conductor screen layer, or other layers) of electrical cable 32A as the layers are cut. For example, as illustrated and described in later FIGS., cable preparation device 50 may include one or more cutting tools (e.g., knife blades, saws, etc.) that are configured to cut the various layers of electrical cable 32A.

Cable preparation device 50 includes a computing device 52 configured to control operation of the cable preparation device 50. For example, computing device 52 may control a cut depth and cutback length of the cutting tools as cable preparation device 50 cuts various layers of electrical cable 32A. In general, computing device 52 may be any computing platform having one or more processors that provide an execution environment of programmable instructions. For example, computing device may be one or more computers (e.g., servers) coupled to cable preparation device or may be one or more processors embedded within cable preparation device 50, such as on one or more printed circuit boards. Computing device 52 may be communicatively coupled to other computing devices (e.g., computing device 42 and/or EEMS 6). As one example, computing device 52 may include a communication unit (e.g., wired and/or wireless) to communicate (e.g. via network 4) with EEMS 6. Example wireless communication units include WiFi®, Bluetooth®, or RFID devices, among others. Example wired communication units include networking cards, universal serial bus (USB) devices, among others.

As described herein, a computing device (such as any one or more of computing device 52, computing device 42, EEMS 6, or a combination thereof) may determine target cutting distances (e.g., a target cutting depth and/or a target cutback length) for respective layers of electrical cable 32A. As used throughout this disclosure, the cutback length refers to a distance along a longitudinal axis of electrical cable 32A (e.g., an axis co-axial with an axis of electrical cable 32A) and the cutting depth refers to a distance extending radially from the longitudinal axis of electrical cable 32A.

In some examples, one or more of computing device 52, 42 and/or EEMS 6 may automatically determine the target cutting distances data stored within a repository (e.g., database) specifying cutting distances based on a type of electrical cable 32A. A type of electrical cable 32A may, for example, refer to combinations of one or more of a manufacturer of electrical cable 32A, electrical rating (e.g., voltage and/or current rating) of electrical cable 32A, a geographic location in which the electrical cable is intended to be used (e.g., United States, Europe, etc.), a construction of the electrical cable (e.g., copper conductor or aluminum conductor), among other types. The type of electrical cable may be input into one or more of computing device 52, 42 and/or EEMS 6 manually using a user interface or automatically (or semi-automatically) using an RFID reader, a character recognition device, a barcode scanner, a camera, or the like. In some examples, each cable may have some variation in manufacturing specification due to the manufacturing process variability or the like. Cable preparation device 50 may be configured to measure cable dimensions, determine a cable type, determine cable materials of construction, or the like to account for cable variations from a manufacturing specification this with sensors like a camera, or can adjust to it automatically and mechanically with a spring force on the blade that can adjust for ovality, for example. In this way, a target cutting distances may be determined, e.g., by one or more of computing device 52, 42 and/or EEMS 6, based on a type of electrical cable and at least one of manually, automatically, or semi-automatically verified cable characteristics.

In some example implementations, a computing device (e.g., computing device 52) automatically determine the type of electrical cable 32A to be prepared based on, for example, on identification information for electrical cable 32A, which may be automatically acquired by the cable preparation device. For example, computing device 52 may include a barcode scanner and/or camera to detect a code (e.g., a QR code) on electrical cable 32A, receive the identification information encoded in the code, and determine the type of electrical cable 32A based on the code. As another example, computing device 52 may detect text of other identification information on electrical cable 32A (e.g., using a camera and optical character recognition) to determine the type of electrical cable 32A.

In some scenarios, worker 40 may utilize computing device 42 to scan a code or text on electrical cable 32A. For instance, computing device 42 may include a camera or barcode scanner to detect a code, text, or other identification information on electrical cable 32A. Computing device 42 may determine the identification information for electrical cable 32A and send the identification information to computing device 52, such that computing device 52 may determine the type of electrical cable 32A. As another example, computing device 42 may determine the type of electrical cable 32A and send data indicating the type of electrical cable 32A to computing device 52.

Computing device 52 may determine the target cutting distances based at least in part on the type of electrical cable 32A. For example, computing device 52 may include a data store that stores data indicating the target cutting distances associated with a respective type of electrical cable. As another example, computing device 42 and/or EEMS 6 may include data indicating the target cutting distances associated with a respective type of electrical cable. Computing device 52 may query computing device 42 and/or EEMS 6 to determine the target cutting distances. In some instances, EEMS 6 and/or computing device 52 may determine the type of electrical cable 32A, determine the target cutting distances associated with the type of electrical cable 32A, and output data indicating the target cutting distances to computing device 52.

Computing device 52, computing device 42, and/or EEMS 6 may determine the target cutting distances associated with one or more layers of electrical cable 32A based at least in part on a cable accessory 34A to which electrical cable 32A is to be coupled to. For example, computing device 52 may determine the target cutback length based on a length of cable accessory 34A, such as, for example, a length of cable accessory 34A, a size of a connector of cable accessory 34A, a length or size of other internal structures of cable accessory 34A, operator preference, installation instructions, or the like. In some examples, computing device 52 determines the target cutting distances associated with a layer of electrical cable 32 based on the type of electrical cable 32A and a type of cable accessory 34A.

In some examples, computing device 52 determines one or more target cutting distances based at least in part on one or more images of electrical cable 52. For example, cable preparation device 50 may include one or more cameras configured to generate images of electrical cable 32A. In one example, computing device 52 determines a target cutting depth for respective layers of electrical cable 32A using images of a cross-sectional view of electrical cable 32A. Computing device 52 may determine a scale of the images based on known distances of one or more objects in the image. In one scenario, computing device 52 includes a laser or other light emitting device configured to illuminate at least a portion of electrical cable 32A with a predetermined pattern of light. The one or more images captured by the camera include the predetermined pattern of light, such that computing device 52 may determine the depth of the respective layers based on the known size of the predetermined pattern of light.

Target cutting distances may be input by worker 40 (e.g., via computing device 42 or computing device 52). Computing device 52 may output a notification requesting confirmation of the target cutting distances from worker 40 prior to cutting one or more layers of electrical cable 32A.

Responsive to determining the target cutting distances, computing device 52 may control target cutting device to cut one or more layers of electrical cable based on the target cutting distances associated with the respective layers. For example, computing device 52 causes the cutting tools to move longitudinally (also referred to as axially) along an axis of electrical cable 32A to cut each layer to the respective target cutback distance. As another example, computing device 52 causes the cutting tools to move radially to cut each layer to the respective target cutting depth.

In some examples, computing device 52 calibrates the position of the one or more cutting tools to move the respective actual position of the one or more cutting tools to a designated starting position for the cut. In other words, computing device 52 may determine whether the at least one cutting tool is actually positioned at the starting position for the cut. In some examples, a radial starting position is located on the surface of the layer to be cut. In such examples, computing device 52 determines whether the at least one cutting tool is radially located on the surface of the layer to be cut. In some examples, a longitudinal starting position is located at a longitudinal reference position (also referred to as a zero point or zero position). The longitudinal zero point may be the end of electrical cable 32A or an arbitrary longitudinal position. In some examples, the longitudinal reference position may be located the target cutback distance from the zero position. In some examples, computing device 52 sets the longitudinal reference position to be the end of the electrical cable 32A. For example, computing device 52 may cause the one or more cutting tools to cut through all of the layers of electrical cable 32A and may set the longitudinal zero position to be the longitudinal position of the cutting tool at which cable preparation device 50 cut through all of the layers of electrical cable 32A.

Computing device 52 may determine whether the at least one cutting tool is actually positioned at the starting position for the cut based at least in part on one or more images. For example, computing device 52 may determine whether the at least one cutting tool is radially positioned at a surface of the layer to be cut based on one or more images. Similarly, computing device 52 may determine whether the at least one cutting tool is longitudinally positioned at the longitudinal reference position based on the one or more images.

In some instances, computing device 52 determines whether the at least one cutting tool is actually positioned at the radial starting position for the cut based at least in part on an amount of mechanical resistance or force experienced by the at least one cutting tool as the at least one cutting tool is moved radially towards electrical cable 32A. In such instances, the mechanical resistance increases as the at least one cutting tool contacts the surface of the layer to be cut and computing device 52 determines that the at least one cutting tool is actually positioned at the radial starting position (e.g., at the surface of the layer to be cut) in response to determining that the mechanical resistance satisfies (e.g., is greater than or equal to) a threshold mechanical resistance.

According to one or more examples, computing device 52 determines whether the at least one cutting tool is actually positioned at the radial starting position for the cut based at least in part the electrical characteristics of the at least one cutting tool. For example, computing device 52 may determine the electrical resistance or capacitance of the cutting tool relative to another component of the cable preparation device 50 as the cutting tool moves radially. For example, computing device 52 may determine that the cutting tool has reached the surface of a particular layer of electrical cable 32A in response to detecting a change in the electrical resistance or capacitance (e.g., the electrical characteristic increases or decreases by more than a threshold amount).

Computing device 52 determines whether the actual cutting distance satisfies the target cutting distances. In one example, computing device 52 determines whether the actual depth or cutback length of the cut performed by the one or more cutting tools satisfies the target cutting depth or target cutback length, respectively.

Computing device 52 may determine the actual depth and/or cutback length of the cut performed by the cutting tools based on one or more images of electrical cable 32A. For example, one or more cameras of cable preparation device 50 may generate one or more images of a cross-sectional of electrical cable 32, of a longitudinal surface of electrical cable 32, or both. The one or more cameras may generate images of electrical cable 32A during and/or after cutting electrical cable 32A. In some examples, computing device 52 determines the actual cutting distances (e.g., cutback length) based on a contrast in color of the various layers of electrical cable 32A. For example, a first layer (e.g., an insulation layer) may be substantially one color (e.g., black) and the adjoining layer (e.g., an insulation shield layer) may be substantially another color (e.g., white) having a relatively large contrast to the first color. In some examples, computing device 52 determine a longitudinal boundary between the first layer and the second layer based on the color contrast. In such examples, computing device 52 determines the actual cutback length by determining the distance between the boundary and the zero point for the longitudinal direction.

Computing device 52 may determine the actual cutting depth of a layer based at least in part on the electrical characteristics of the layer. In some examples, computing device 52 may determine that the depth of the cut based on an electrical resistance or capacitance. For example, computing device 52 may determine the cutting tools have cut through a layer in response to detecting a change in the electrical resistance or capacitance. As one example, computing device 52 may determine cable preparation tool 50 has cut through a conductive or semi-conductive layer and has reached an insulation layer in response to detect an increase in the electrical resistivity.

In some examples, computing device 52 determines whether the actual cutting distance satisfies the target cutting distance by causing cable preparation device 50 to perform a number of test cuts. For example, computing device 52 may position the cutting tool at a first test cut position between a longitudinal zero point and the target cutback position, and cause the cutting tool to cut to a first cutting depth. The target cutback position may refer to the position at which the distance to the zero position equals the target cutback distance. Computing device 52 determines whether the first cutting depth satisfies (e.g., is greater than or equal to) the target cutting depth (e.g., based on one or more images and/or electrical characteristics). If the cutting first cutting depth does not satisfy target cutting depth (e.g., such that cable preparation device 50 did not cut through the entire layer), computing device 52 may cause cable preparation device 50 to reposition the cutting tools to a second cutting depth and perform a second test cut at another longitudinal position (e.g., a position between the target cutback position and the position of the first test cut). In other words, computing device 52 may cause cable preparation device 52 to successively cut deeper into a particular layer to determine the target cutting depth for that layer. Computing device 52 may determine whether the second cutting depth satisfies the target cutting depth. Responsive to determining that the second cutting depth does satisfy the target cutting depth, computing device 52 may cause cable preparation device 52 to position the cutting tool at the target cutback position and cut the layer to the second cutting depth.

Computing device 52 determines, in some examples, whether electrical cable 32A includes a defect. In some examples, computing device 52 determines whether electrical cable 32A includes a defect by determining whether a diameter of a respective layer satisfies the target or threshold diameter. For example, a camera of cable preparation device 50 may take one or more images of a cross-sectional view of electrical cable 32A and computing device 52 may determine the diameter of a layer based on one or more images. Computing device 52 may determine a scale of the images based on known distances of one or more objects in the image. In one scenario, computing device 52 includes a laser or other light emitting device configured to illuminate at least a portion of electrical cable 32A with a predetermined pattern of light. The one or more images captured by the camera include the predetermined pattern of light, such that computing device 52 may determine the diameter of the respective layers based on the known size of the predetermined pattern of light.

In some examples, computing device 52 determines whether electrical cable 32A includes a defect by determining whether the boundary between layers is crisp. In other words, computing device 52 determines a variance in the longitudinal boundary between a one layer of electrical cable 32A and an adjacent layer of electrical cable 32A satisfies a threshold variance. In some examples, the boundary between layers may be uneven, such that the boundary between layers may closer to the longitudinal zero point in one location relative to the boundary be between layers at another location of the electrical cable. Computing device 52 may determine the variance in the boundary based on one or more images of electrical cable 52. Responsive to determining that the variance satisfies (e.g., is greater than or equal to) a threshold variance, computing device 52 may determine that electrical cable 32A includes a defect. In some examples, computing device 52 may cause the cutting tools of cable preparation device 50 to re-cut one or more layers of electrical cable 32A in response to determining the boundary between layers is not crisp.

Computing device 52 may determine whether electrical cable 32A includes defects by determining whether any layers of electrical cable 32A include cuts, gouges, or is otherwise missing material where the layer should include material for that layer. In some instances, computing device 52 determines whether electrical cable 32A includes cuts or gouges based on one or more images of electrical cable 32A. Computing device 52 may determine that electrical cable 32A includes a defect in response to determining that one or more layers of electrical cable 32A include a cut or gouge. In some examples, computing device 52 may cause the cutting tools of cable preparation device 50 to re-cut one or more layers of electrical cable 32A in response to determining one or more layers includes a cut or gouge.

As another example, computing device 52 may determine that electrical cable 32A includes a defect in response to determining that a surface of one or more layers of electrical cable 32A includes debris. The debris may include a portion of a layer which should have been removed but which remains attached to electrical cable 32A. For example, computing device 52 may determine whether a portion of a layer remains between the longitudinal zero point and the cutback position associated with that layer. For example, a portion of a layer may be stuck on the electrical cable even if the surrounding portions of the layer were successfully removed. In some instances, computing device 52 determines whether the surface of one or more layers include debris based on one or more images of electrical cable 32A. As one example, computing device 52 may determine that electrical cable 32A includes debris and hence a defect in response to determining that the portion of the layer which should have been removed remains attached to electrical cable 32A.

Cable preparation device 50 may include a debris removal device. In some examples, the debris removal device includes a vacuum or blower configured to force air onto electrical cable 32A. Computing device 52 may turn on the debris removal device of cable preparation device 50 in response to determining that electrical cable 32A includes debris on a surface of a layer of electrical cable 32A.

Computing device 52, computing device 42, and/or EEMS 6 may determine whether cable preparation device 50 should be serviced. In one example, computing device 52 determines whether cable preparation device 50 should be serviced by determining whether cable preparation device 50 is aligned properly. Computing device 52 may determine whether cable preparation device 50 is aligned properly based on image data.

In some examples, computing device 52, computing device 42, and/or EEMS 6 may determine whether cable preparation device 50 should be serviced by determining whether one or more cutting tools of cable preparation device 50 are worn (e.g., whether the wear satisfies a threshold amount of wear). For example, computing device 52 may determine whether the cutting tools are relatively dull (e.g., compared to a newer cutting tool). In some instances, computing device 52 determines whether the cutting tool is worn based on amount of time the cutting tool has been in service. For instance, computing device 52 may determine that cable preparation device should be serviced to replace the at least one cutting tool in response to determining that the amount of time the cutting tool has been in service satisfies (e.g., is greater than or equal to) a threshold amount of time.

In one example, computing device 52 determines whether the amount of wear of the cutting tool satisfies a threshold amount of wear based at least in part on an amount of force applied by the at least one cutting tool to cut through the at least one layer of the electrical cable. For instance, if the amount of force applied to cut through a particular layer is greater than a threshold amount of force, computing device 52 may infer that the cutting tool is relatively dull and should be replaced. Force may be measured directly with another sensor, but this may not be needed. Force may not be measured directly, in all examples, but torque may be useful and may be calculated using motor revolutions per minute (RPM), motor voltage, motor current draw, and/or motor efficiency. In some examples, computing device 52 may determine, based on a determine force, that cable preparation device 50 should be serviced to replace a cutting tool. In some examples, computing device 52 determines that a cutting tool should be serviced based on a determined force and the characteristics of the layer of electrical cable 32A being cut. For example, computing device 52 may normalize the amount of force by a type of the material of the layer being cut. For instance, cable preparation device 50 may apply different amounts of force to cut through different materials, and may determine whether the cutting tool is worn based on the force and the type of material.

Responsive to determining that cable preparation device 50 should be service, in some examples, computing device 52 outputs a notification to another computing device indicating that cable preparation device 50 should be serviced. For example, computing device 52 may output the notification to EEMS 6, such that EEMS 6 may schedule servicing (e.g., create a work order) and/or send a message to computing devices 16 to alert remote users 18 to service cable preparation device 50. As another example, computing device 52 may output an alert (e.g., audible, visual, haptic) indicating cable preparation device 50 should be serviced. For instance, cable preparation device 50 may include one or more lights or a display that outputs a visual alert.

In some examples, computing device 52, computing device 42, or EEMS 6 may utilize machine learning to determine characteristics of electrical cable preparation that contribute to failure of electrical cables 32. For example, computing device 52 or EEMS 6 may store cable preparation data (e.g., image data of electrical cables 32, dimensions of cuts associated with respective layers of electrical cables 32, types of electrical cables 32, cutting techniques for cutting layers of electrical cables 32, etc.) for a plurality of electrical cables 32 and known failure events of electrical cables 32. Computing device 52 and/or EEMS 6 may train a model based on the cable preparation data to determine characteristics of a cable or cable preparation associated with failure events of electrical cables. In one example, computing device 52 and/or EEMS 6 may determine, based on the cable preparation data, a relationship between life expectancy of an electrical cable and different types of cuts or different cutting dimensions. As another example, computing device 52 and/or EEMS 6 may determine that certain types of electrical cables 32 may be more likely to fail if the boundary between layers is not very crisp or if a diameter of one or more layers is too small, and that other types of electrical cables 32 may be more tolerant (e.g., less likely to fail) to variations in layer distances. In this way, computing device 52 and/or EEMS 6 may train one or more models to learn the which characteristics of the cable preparation increase the probability that the electrical cable 32 is will last and/or which characteristics increase the probability that the electrical cable 32 will fail prematurely.

Computing device 52 and/or EEMS 6 may perform at least one operation based on the models. For example, computing device 52 may update one or more cutting rules for cable preparation device 50. For instance, computing device 52 may update cutting rules associated with a type of electrical cable 32, such as a target cutting depth, target cutback distance, application of grease, cutting shape (e.g., straight, taper, or bevel), or application of heat.

In some examples, computing device 52 and/or EEMS 6 applies one or more models (e.g., in real time) to determine whether electrical cable 32A will fail prematurely. For example, computing device 52 may apply a model to cable preparation data for electrical cable 32A to predict whether electrical cable 32A will fail prematurely. As one example, computing device 52 may determine that the electrical cable 32A is likely to fail prematurely based on the current cutting distances (e.g., depth or cutback distance) of the layers. In such examples, EEMS 6 may output a notification (e.g., to computing device 52 or 42) indicating that electrical cable 32A should be re-cut.

In some examples, computing device 52 may cause cable preparation device 50 to apply a lubricant to one or more layers of electrical cable 32A after cutting the one or more layers.

Environment 8B may include an electrical cable coupling device 54 configured to mechanically affix the electrical cable 32A to a cable accessory 34A. For example, electrical cable coupling device 54 may couple electrical cables 32A, 32B to cable accessory 34A by inserting electrical cables 32A, 32B into opposing ends of cable accessory 34A. Environment 8B may also include an electrical cable finishing device 56 configured to apply a splice body or a termination body to the electrical cable 32A and cable accessory 34A. For example, electrical cable finishing device 56 may apply a heat shrink or cold shrink wrap to electrical cables 32A, 32B and cable accessory 34A after coupling electrical cables 32A, 32B into opposing ends of cable accessory 34A. In some instances, computing device 52 controls operation of electrical cable coupling device 54, electrical cable finishing device 56, or both.

In this way, the computing device may enable a cable preparation device to prepare an electrical cable faster and control the cutting depth and cutback length of cuts to one or more layers of an electrical cable more accurately than other techniques. Cutting the layers of the electrical cable more accurately may reduce defects in the electrical cable (e.g., in a cable splice). For example, cutting the layers more accurately may reduce air voids, and hence the decrease the probability and/or quantity of partial discharge events. Reducing the probability and/or quantity of partial discharge events may decrease the probability of failure events of the electrical cable and increase the life expectancy of the electrical cable. Reducing the probability of failure events may increase the reliability of the power grid. Further, increasing life expectancy of the electrical cable may decrease costs of constructing, operating, and maintaining the power grid.

The examples described above and herein have been discussed with respect to computing device 52 for purposes of example. It is understood that the functions described may be implemented by any computing device, such as any one or more of computing device 52, computing device 42, EEMS 6, or a combination thereof. Moreover, the term computing device is used to refer to any computing platform having one or more processors that provide an execution environment of programmable instructions. For example, a computing device may be one or more computers (e.g., servers, desktops, laptops, blade computers, virtual machines or the like) coupled to or otherwise in communication with a cable preparation device. As other examples, a computing device may be one or more processors embedded within a cable preparation device.

Figure 2:
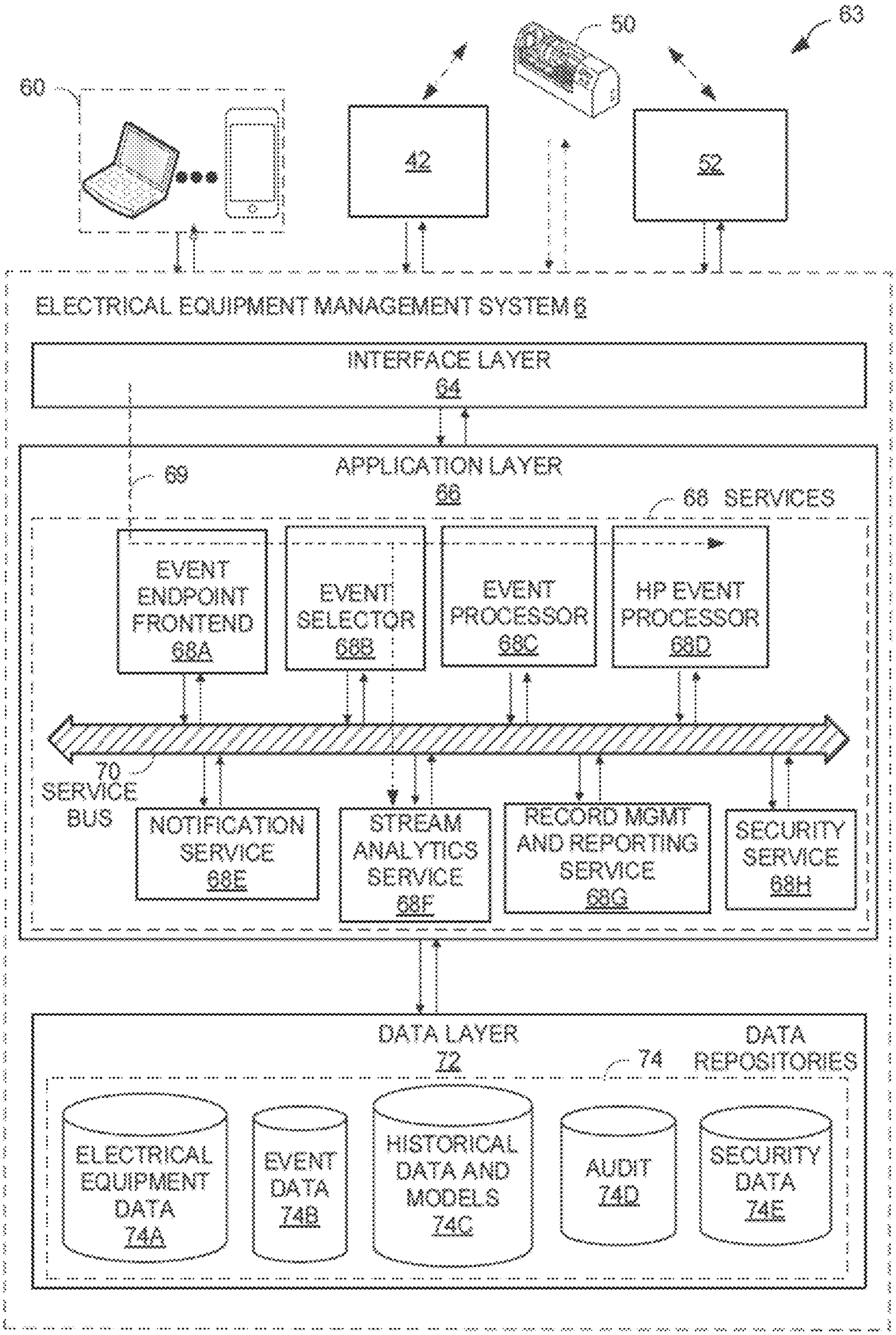
FIG. 2 is a block diagram illustrating an operating perspective of the electrical equipment management system shown in FIG. 1, in accordance with various techniques of this disclosure.

FIG. 2 is a block diagram providing an operating perspective of EEMS 6 when hosted as cloud-based platform capable of supporting multiple, distinct environments 8 each having a plurality of articles of electrical equipment 20. In the example of FIG. 2, the components of EEMS 6 are arranged according to multiple logical layers that implement the techniques of the disclosure. Each layer may be implemented by one or more modules comprised of hardware, software, or a combination of hardware and software.

In FIG. 2, cable preparation device 50, computing device 52, and/or computing device 42 operate as clients 63 that communicate with EEMS 6 via interface layer 64. Computing devices 60 typically execute client software applications, such as desktop applications, mobile applications, and web applications. Computing devices 60 may represent any of computing devices 16 of FIG. 1. Examples of computing devices 60 may include, but are not limited to, a portable or mobile computing device (e.g., smartphone, wearable computing device, tablet), laptop computers, desktop computers, smart television platforms, and servers, to name only a few examples.

As further described in this disclosure, cable preparation device 50, computing device 52, and/or computing device 42 communicate with EEMS 6 to provide streams of data to EEMS 6 and receive from EEMS 6 alerts, configuration data, and other communications. Client applications executing on computing devices 60 may communicate with EEMS 6 to send and receive data that is retrieved, stored, generated, and/or otherwise processed by services 68A-68H (collectively, services 68). For instance, the client applications may request and edit event data including analytical data stored at and/or managed by EEMS 6. In some examples, the client applications may request and display aggregate event data that summarizes or otherwise aggregates numerous individual instances of failure events and corresponding data acquired from monitoring devices 33 and/or generated by EEMS 6. The client applications may interact with EEMS 6 to query for analytics data about past and predicted failure events. In some examples, the client applications may output (e.g., for display) data received from EEMS 6 to visualize such data for users of clients 63.

In some examples, EEMS 6 may provide data to the client applications, which the client applications output for display in user interfaces. For example, EEMS 6 may be configured to interacts with a user, e.g., an operator of a cable preparation system, to determine selected cutback dimensions, cable construction, or other data to determine parameters of a cable preparation system for properly cutting a cable. In some examples, the user can provide some or all the required information to prepare the cable. In some examples, one or more component of the cable preparation system, such as, for example, one or more cameras, measuring device, or the like, may be used to validate the user inputted information or determine the cable construction and measure the cable diameters and the layer dimensions as well as any nonuniformity (ovality, eccentricity), or other data to determine parameters of a cable preparation system for properly cutting a cable. In some examples, a cable accessory or cable connector information (e.g., ID or part number) can be entered by the user, or the user can scan an identification from the instructions or packaging of the components (e.g., a barcode or RFID). Once a given cable, accessory, and connector are in the system, then cable preparation system may be configured to recall the previous setting with limited further user input.

Clients applications executing on computing devices 60 may be implemented for different platforms but include similar or the same functionality. For instance, a client application may be a desktop application compiled to run on a desktop operating system or may be a mobile application compiled to run on a mobile operating system. As another example, a client application may be a web application such as a web browser that displays web pages received from EEMS 6. In the example of a web application, EEMS 6 may receive requests from the web application (e.g., the web browser), process the requests, and send one or more responses back to the web application. In this way, the collection of web pages, the client-side processing web application, and the server-side processing performed by EEMS 6 collectively provides the functionality to perform techniques of this disclosure. In this way, client applications use various services of EEMS 6 in accordance with techniques of this disclosure, and the applications may operate within various different computing environment (e.g., embedded circuitry or processor of a desktop operating system, mobile operating system, or web browser, to name only a few examples).

As shown in FIG. 2, EEMS 6 includes an interface layer 64 that represents a set of application programming interfaces (API) or protocol interface presented and supported by EEMS 6. Interface layer 64 initially receives messages from any of clients 63 for further processing at EEMS 6. Interface layer 64 may therefore provide one or more interfaces that are available to client applications executing on clients 63. In some examples, the interfaces may be application programming interfaces (APIs) that are accessible over a network. Interface layer 64 may be implemented with one or more web servers. The one or more web servers may receive incoming requests, process and/or forward data from the requests to services 68, and provide one or more responses, based on data received from services 68, to the client application that initially sent the request. In some examples, the one or more web servers that implement interface layer 64 may include a runtime environment to deploy program logic that provides the one or more interfaces. As further described below, each service may provide a group of one or more interfaces that are accessible via interface layer 64.

In some examples, interface layer 64 may provide Representational State Transfer (RESTful) interfaces that use HTTP methods to interact with services and manipulate resources of EEMS 6. In such examples, services 68 may generate JavaScript Object Notation (JSON) messages that interface layer 64 sends back to the client application that submitted the initial request. In some examples, interface layer 64 provides web services using Simple Object Access Protocol (SOAP) to process requests from client applications. In still other examples, interface layer 64 may use Remote Procedure Calls (RPC) to process requests from clients 63. Upon receiving a request from a client application to use one or more services 68, interface layer 64 sends the data to application layer 66, which includes services 68.

Data layer 72 of EEMS 6 represents a data repository that provides persistence for data in EEMS 6 using one or more data repositories 74. A data repository, generally, may be any data structure or software that stores and/or manages data. Examples of data repositories include but are not limited to relational databases, multi-dimensional databases, maps, and hash tables, to name only a few examples. Data layer 72 may be implemented using Relational Database Management System (RDBMS) software to manage data in data repositories 74. The RDBMS software may manage one or more data repositories 74, which may be accessed using Structured Query Language (SQL). Data in the one or more databases may be stored, retrieved, and modified using the RDBMS software. In some examples, data layer 72 may be implemented using an Object Database Management System (ODBMS), Online Analytical Processing (OLAP) database or other suitable data management system.

Electrical equipment data 74A of data repositories 74 may include data corresponding to a plurality of articles of electrical equipment, such as cable accessories 34. In some examples, electrical equipment data 74A may include device or equipment data, manufacturing data, installation data, consumer data, power distribution data, among others. For example, electrical equipment data 74A may include, for each cable accessory of cable accessories 34, data identifying a date of manufacture, a date of installation, a location (e.g., GPS coordinates, street address, etc.), entity that installed the cable accessory, a unique identifier (e.g., serial number), a type of cable accessory, etc. For example, prior to joining electrical cables 32A and 32B of FIG. 1 with cable accessory 34A, an installer may scan (e.g., with one of computing devices 16, such as a mobile phone) a barcode on cable accessory 34A that includes device data representing a unique identifier, date of manufacture, and so forth, and may upload the device data to EEMS 6. In some instances, the mobile device may append data such as the current date as the date of installation and GPS coordinates to the device data, and may send the device data to EEMS 6, such that EEMS 6 may store the device data for cable accessory 34A in electrical equipment data 74A. As another example, equipment data may include data indicating cutting dimensions for various types of electrical cables and/or cable accessories.

As shown in FIG. 2, EEMS 6 also includes an application layer 66 that represents a collection of services 68 for implementing much of the underlying operations of EEMS 6. Application layer 66 receives data included in requests received from client devices 63 and further processes the data according to one or more of services 68 invoked by the requests. Application layer 66 may be implemented as one or more discrete software services executing on one or more application servers, e.g., physical or virtual machines. That is, the application servers provide runtime environments for execution of services 68. In some examples, the functionality interface layer 64 as described above and the functionality of application layer 66 may be implemented at the same server.

Application layer 66 may include one or more separate software services 68 (e.g., processes) that communicate with one another (e.g., via a logical service bus 70), as one example. Service bus 70 generally represents a logical interconnections or set of interfaces that allows different services to send messages to other services, such as by a publish/subscription communication model. For instance, each of services 68 may subscribe to specific types of messages based on criteria set for the respective service. When a service publishes a message of a particular type on service bus 70, other services that subscribe to messages of that type will receive the message. In this way, each of services 68 may communicate data to one another. As another example, services 68 may communicate in point-to-point fashion using sockets or other communication mechanism.

As shown in FIG. 2, each of services 68 is implemented in a modular form within EEMS 6. Although shown as separate modules for each service, in some examples the functionality of two or more services may be combined into a single module or component. Each of services 68 may be implemented in software, hardware, or a combination of hardware and software. Moreover, services 68 may be implemented as standalone devices, separate virtual machines or containers, processes, threads or software instructions generally for execution on one or more physical processors. In some examples, one or more of services 68 may each provide one or more interfaces that are exposed through interface layer 64. Accordingly, client applications of computing devices 60 may call one or more interfaces of one or more of services 68 to perform techniques of this disclosure.

In accordance with techniques of the disclosure, services 68 may include an event processing platform including an event endpoint frontend 68A, event selector 68B, and event processor 68C. Event endpoint frontend 68A operates as a front-end interface for receiving and sending communications to cable preparation device 50, computing device 52, and/or computing device 42. In other words, event endpoint frontend 68A operates to as a front line interface to monitoring devices 33 deployed within environments 8 of FIG. 1. In some instances, event endpoint frontend 68A may be implemented as a plurality of tasks or jobs spawned to receive individual inbound communications of event streams 69 from the monitoring devices 33 (e.g. integrated within cable accessories 34) carrying data sensed and captured by sensors of the monitoring devices 33. When receiving event streams 69, for example, event endpoint frontend 68A may spawn tasks to quickly enqueue an inbound communication, referred to as an event, and close the communication session, thereby providing high-speed processing and scalability. Each incoming communication may, for example, carry recently captured data representing sensed conditions, motions, temperatures, actions or other data, generally referred to as events. Communications exchanged between the event endpoint frontend 68A and the cable accessories 34 may be real-time or pseudo real-time depending on communication delays and continuity.

Event selector 68B operates on the stream of events 69 received from cable preparation device 50, computing device 52, and/or computing device 42 via frontend 68A and determines, based on rules or classifications, priorities associated with the incoming events. Based on the priorities, event selector 68B enqueues the events for subsequent processing by event processor 68C or high priority (HP) event processor 68D. Additional computational resources and objects may be dedicated to HP event processor 68D so as to ensure responsiveness to critical events, such as actual failure or predicted imminent failure of a cable accessory 34. Responsive to processing high priority events, HP event processor 68D may immediately invoke notification service 68E to generate alerts, instructions, warnings or other similar messages to be output to monitoring devices 33 or users 18 of computing devices 60. Events not classified as high priority are consumed and processed by event processor 68C.

In general, event processor 68C or high priority (HP) event processor 68D operate on the incoming streams of events to update event data 74B within data repositories 74. In general, event data 74B includes data indicative of sensor data obtained from monitoring devices 33 (e.g., integrated with cable accessories 34), device data for electrical equipment 20 of FIG. 1, analysis data, or a combination therein. For example, in some instances, event data 74B may include entire streams of samples of data obtained from sensors of monitoring devices 33. In other instances, event data 74B may include a subset of such data, e.g., associated with a particular time period. As another example, event data 74B may include analysis data indicating results of analysis of sensor data performed by one or more of cable preparation device 50, computing device 52, and/or computing device 42.

Event processors 68C, 68D may create, read, update, and delete event data stored in event data 74B. Event data may be stored in a respective database record as a structure that includes name/value pairs of data, such as data tables specified in row/column format. For instance, a name of a column may be "Accessory ID" and a value may be a unique identification number (e.g., unique identifier) corresponding to a particular article of electrical equipment 20 of FIG. 1. An event record may include data such as, but not limited to: equipment identification, data acquisition timestamp(s), and data indicative of one or more sensed parameters.

Event selector 68B may direct the incoming stream of events to stream analytics service 68F, which is configured to perform in depth processing of the incoming stream of events to perform real-time analytics. Stream analytics service 68F may, for example, be configured to process and compare multiple streams of event data 74B with historical data and models 74C in real-time as event data 74B is received. In this way, stream analytics service 68F may be configured to detect anomalies, transform incoming event data values, or trigger alerts upon predicting a possible failure event (e.g., failure of an article of electrical equipment 20). Historical data and models 74C may include, for example, one or more trained models configured to predict whether a failure vent will occur, an expected remaining lifespan for one or more articles of electrical equipment 20, and/or prioritize maintenance (e.g., repair or replacement) of articles of electrical equipment. In addition, stream analytics service 68F may generate output for communicating to cable accessories 34 (e.g., via notification service 68E) or computing devices 60 (e.g., via notification service 68G or record management and reporting service 68G).

In this way, analytics service 68F processes inbound streams of events, potentially hundreds or thousands of streams of events, from monitoring devices 33 within environments 8 to apply historical data and models 74C to compute assertions, such as identified anomalies or predicted occurrences of imminent failure events based on conditions sensed by the sensors of the monitoring devices 33. Stream analytics service 68F may publish the assertions to notification service 68F and/or record management by service bus 70 for output to any of clients 63.

In this way, analytics service 68F may be configured as an active electrical equipment management system that predicts failure events (e.g., potentially imminent failures or failures likely to occur within a threshold amount of time) and provides real-time alerting and reporting. In addition, analytics service 68F may be a decision support system that provides techniques for processing inbound streams of event data to generate assertions in the form of statistics, conclusions, and/or recommendations on electrical equipment 20 for utilities, workers, and other remote users. For instance, analytics service 68F may apply historical data and models 74C to determine a probability of failure of one or more articles of electrical equipment 20 (e.g., cable accessories 34), prioritize repair and/or replacement of the article of electrical equipment, etc. Hence, analytics service 68F may maintain or otherwise use one or more models that provide risk metrics to predict failure events.

In some examples, analytics service 68F may generate user interfaces based on processing data stored by EEMS 6 to provide actionable data to any of clients 63. For example, analytics service 68F may generate dashboards, alert notifications, reports and the like for output at any of clients 63. Such data may provide various insights regarding baseline ("normal") operation across environments 8 or electrical equipment 20 (e.g., cable accessories 34), identifications of any anomalous characteristics of electrical equipment 20 that may potentially cause a failure of at least a portion of the power grid within an environment 8, and the like.

According to aspects of this disclosure, as noted above, EEMS 6 may apply analytics to predict the likelihood of a failure event. Although other technologies can be used, in one example implementation, analytics service 68F utilizes machine learning when operating on event streams so as to perform real-time analytics. That is, analytics service 68F may include executable code generated by application of machine learning to training data of event streams and known failure events to detect patterns. The executable code may take the form of software instructions or rule sets and is generally referred to as a model that can subsequently be applied to event streams 69 for detecting similar patterns and predicting upcoming events. For example, analytics service 68F may determine a status or health (e.g., predicted remaining lifespan) of the respective article of equipment 20 (e.g., cable accessory 34A) or predict whether/when the respective article of electrical equipment 20 will experience a failure event. That is, EEMS 6 may determine the likelihood or probability of a failure event based on application historical data and models 74C to event data received from electrical equipment 20. For example, EEMS 6 may apply historical data and models 74C to event data from monitoring devices 33 in order to compute assertions, such as anomalies or predicted occurrences of imminent failure events based on sensor data, environmental conditions, and/or other event data corresponding to electrical equipment 20 monitored by monitoring devices 33.

EEMS 6 may apply analytics to identify relationships or correlations between data from computing device 52 of cable preparation device 50 (e.g., image data indicative of layers of electrical cables 32 cut by cable preparation device 50), sensed data from sensors of monitoring devices 33, monitoring electrical equipment 20, environmental conditions of environments in which electrical equipment 20 is located, a geographic region in which electrical equipment 20 is located, a type of electrical equipment 20, a manufacturer and/or installer of electrical equipment, among other factors. EEMS 6 may determine, based on the data acquired across populations of electrical equipment 20, conditions, possibly within a certain environment or geographic region, lead to, or are predicted to lead to, unusually high occurrences of failure events. EEMS 6 may generate alert data based on the analysis of the event data and transmit the alert data to computing devices 16 and/or monitoring device 33. Hence, according to aspects of this disclosure, EEMS 6 may determine event data of monitoring devices 33, generate status indications, determine performance analytics, and/or perform prospective/preemptive actions based on a likelihood of a failure event (e.g., scheduling maintenance or replacement).

Analytics service 68F may, in some example, generate separate models for different environments, geographic areas, types of electrical equipment, or combinations thereof. Analytics service 68F may update the models based on event data received from monitoring devices 33. For example, analytics service 68F may update the models for a particular geographic area, a particular type of electrical equipment, a particular environment, or combinations thereof based on event data received from monitoring devices 33. Alternatively, or in addition, analytics service 68F may communicate all or portions of the generated code and/or the machine learning models to cable preparation device 50, computing device 52, and/or computing device 42 for execution thereon so as to provide local alerting in near-real time.

Example machine learning techniques that may be employed to generate models 74C can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms and the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbour (kNN), Learning Vector Quantization (LVQ), Self-Organizing Map (SOM), Locally Weighted Learning (LWL), Ridge Regression, Least Absolute Shrinkage and Selection Operator (LASSO), Elastic Net, and Least-Angle Regression (LARS), Principal Component Analysis (PCA) and Principal Component Regression (PCR).

EEMS 6 may initially train models 74C based on a training set of event data and, in some examples, on data for corresponding failure events. As further example description, EEMS 6 may select a training set comprising a set of training instances, each training instance comprising an association between event data and a failure event. EEMS 6 may, for each training instance in the training set, modify, based on particular event data and a particular failure event of the training instance, one or more of models 74C to change a likelihood predicted by the models for the particular failure event in response to subsequent event data applied to the models 74C. In some examples, the training instances may be based on real-time or periodic data generated while EEMS 6 managing data for one or more articles of electrical equipment and/or work environments. As such, one or more training instances of the set of training instances may be generated from use of one or more articles of electrical equipment 20 after EEMS 6 performs operations relating to the detection or prediction of a failure event for an article of electrical equipment 20.

By training a model based on the training set, analytics service 68F may apply the model to the event data and generate higher probabilities or scores for failure events that correspond to training feature sets that are more similar to the particular feature set. In the same way, analytics service 68F may apply the model the event data and generate lower probabilities or scores for failure events that correspond to training feature sets that are less similar to the particular feature set. Accordingly, analytics service 68F may train one or more models 74C, receive event data from one or more monitoring devices 33 monitoring respective articles of electrical equipment 20, and output one or more probabilities or scores that indicate likelihoods of failure events based on the received event data vector.

In some examples, analytics service 68F may train one or models 74C based on cable preparation data (e.g., image data of electrical cables 32, dimensions of cuts associated with respective layers of electrical cables 32, types of electrical cables 32, cutting techniques for cutting layers of electrical cables 32, etc.) for a plurality of electrical cables 32 and known failure events of electrical cables 32. For example, analytics service 68F may determine, based on the training data, a relationship between life expectancy of an electrical cable and different types of cuts or different cutting dimensions.

In some examples, analytics service 68F trains the one or more models 74C based on failure events for articles of electrical equipment 20 and/or work environment having similar characteristics (e.g., of a same type). In some examples the "same type" may refer to identical but separate instances of articles of electrical equipment. In other examples the "same type" may not refer to identical instances of electrical equipment. For instance, although not identical, a same type may refer to articles of electrical equipment in a same class or category of electrical equipment, same model of electrical equipment, or same set of one or more shared functional or physical characteristics, to name only a few examples. Similarly, a same type of environment may refer to identical but separate instances of work environment types. In other examples, although not identical, a same type may refer to an environment in a same class or category of environments, such as "below ground electrical cables", "underwater electrical cables", a particular US state, climate, among others.

In some examples, analytics service 68F may predict a failure event based at least in part on application of models 74C to event data 69, such as cable preparation data generated by cable preparation device 50. For example, analytics service 68F may apply one or more models 74C to cable preparation data indicating the actual cutting dimensions (e.g., depth and/or cutback length) of various layers of electrical cable 32A to determine a probability that electrical cable 32A will fail.

According to aspects of this disclosure, EEMS 6 may output information to cable preparation device 50 to enable cable preparation device 50 to prepare electrical cables 32 for installation to a power grid. For example, EEMS 6 may output target cutting dimensions to cable preparation device 50.

EEMS 6 may perform the techniques disclosed above with reference to FIG. 1 and computing devices 42, 52. For examples, EEMS 6 may determine whether a component (e.g., a cutting tool) of cable preparation device 50 should be serviced. In some examples, EEMS 6 schedules maintenance (e.g., repair or replacement) operations of electrical equipment 20 (e.g., cable preparation device 50) based on event data. In some examples, analytics service 68F may automatically order replacement electrical equipment 20 based on one or more models 74C.

In some examples, analytics service 68F may output a notification (e.g., to computing devices 16) in response to determining an electrical cable is likely to fail, such as a notification to re-cut the layers of an electrical cable or apply different cutting techniques. For example, analytics service 68F may output a notification to one or more computing devices 16 via notification service 68E.

Again, EEMS 6 may determine the above-described performance characteristics and/or generate the alert data based on application of the event data to one or more models 74C. However, while the determinations are described with respect to EEMS 6, as described in greater detail herein, one or more other computing devices, such cable preparation device 50, computing device 52, and/or computing device 42 may be configured to perform all or a subset of such functionality.

Record management and reporting service 68G processes and responds to messages and queries received from computing devices 60 via interface layer 64. For example, record management and reporting service 68G may receive requests from client computing devices for event data related to individual articles electrical equipment 20, groups of articles of electrical equipment (e.g., types of articles), geographic regions of environments 8 or environments 8 as a whole. In response, record management and reporting service 68G accesses event data based on the request. Upon retrieving the event data, record management and reporting service 68G constructs an output response to the client application that initially requested the data. In some examples, the data may be included in a document, such as an HTML document, or the data may be encoded in a JSON format or presented by a dashboard application executing on the requesting client computing device. For instance, as further described in this disclosure, example user interfaces that include the event data are depicted in the figures.

As additional examples, record management and reporting service 68G may receive requests to find, analyze, and correlate event data (e.g., event data for one or more monitoring devices 33 monitoring respective articles of electrical equipment 20). For instance, record management and reporting service 68G may receive a query request from a client application for event data 74B over a historical time frame, such as a user can view event data over a period of time and/or a computing device can analyze the event data over the period of time.

In example implementations, services 68 may also include security service 68H that authenticate and authorize users and requests with EEMS 6. Specifically, security service 68H may receive authentication requests from client applications and/or other services 68 to access data in data layer 72 and/or perform processing in application layer 66. An authentication request may include credentials, such as a username and password. Security service 68H may query security data 74E to determine whether the username and password combination is valid. Security data 74E may include security data in the form of authorization credentials, policies, and any other data for controlling access to EEMS 6. As described above, security data 74E may include authorization credentials, such as combinations of valid usernames and passwords for authorized users of EEMS 6. Other credentials may include device identifiers or device profiles that are allowed to access EEMS 6.

Security service 68H may provide audit and logging functionality for operations performed at EEMS 6. For instance, security service 68H may log operations performed by services 68 and/or data accessed by services 68 in data layer 72. Security service 68H may store audit data such as logged operations, accessed data, and rule processing results in audit data 74D. In some examples, security service 68H may generate events in response to one or more rules being satisfied. Security service 68H may store data indicating the events in audit data 74D.

In general, while certain techniques or functions are described herein as being performed by certain components, e.g., EEMS 6 or computing device 52 of cable preparation device 50, it should be understood that the techniques of this disclosure are not limited in this way. That is, certain techniques described herein may be performed by one or more of the components of the described systems. For example, in some instances, computing device 42 and/or computing device 52 may be responsible for most or all of the processing of event data, determining the likelihood of a failure event, and the like.

Figure 3B:
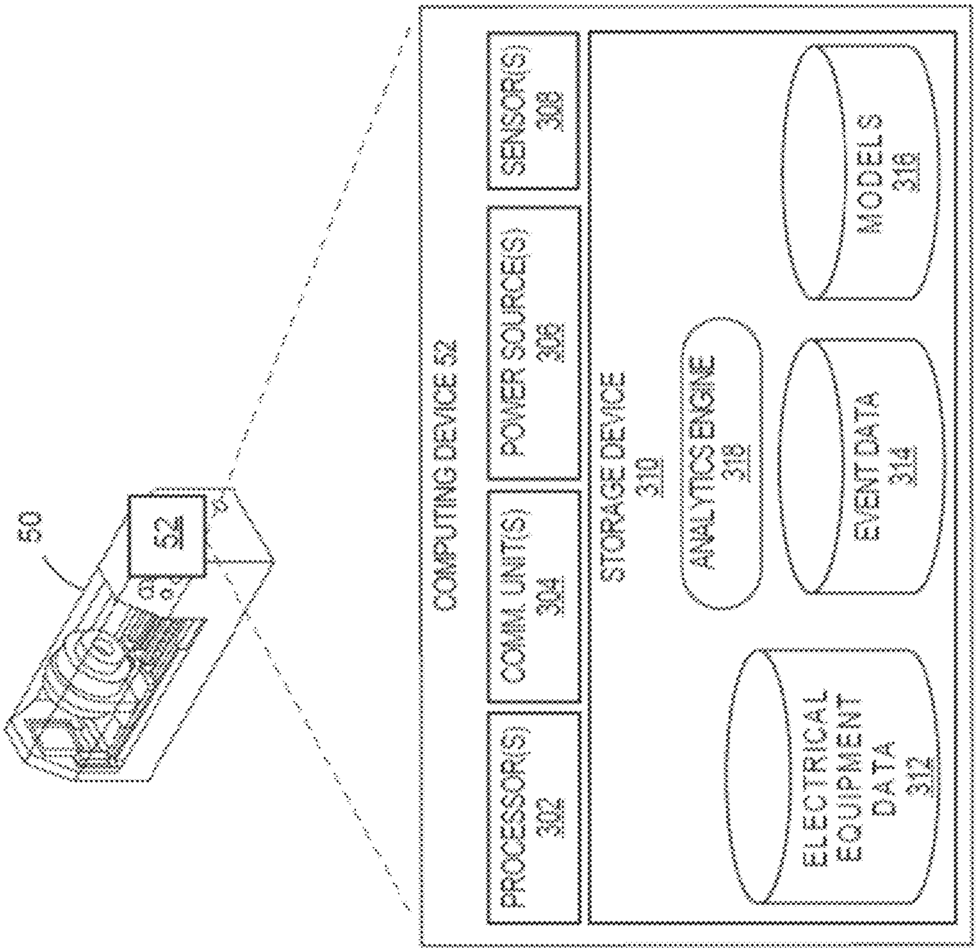
FIGS. 3A and 3B are conceptual diagrams of an example cable preparation device and an electrical cable, in accordance with various techniques of this disclosure.
Figure 3A:
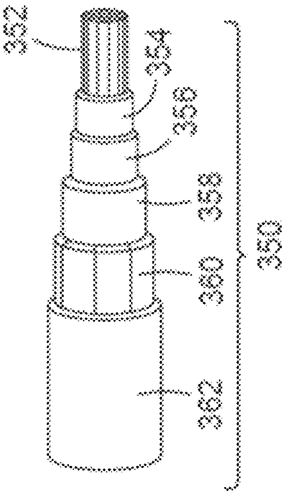

FIGS. 3A and 3B are conceptual diagrams of a cable preparation device 50 configured to prepare an electrical cable 350 for installation to an electrical grid, in accordance with various techniques of this disclosure. Electrical cable 350 may be an example of electrical cables 32 of FIG. 1.

In the example of FIG. 3A, electrical cable 350 includes a plurality of concentric (e.g., cylindrical) layers, such as central conductor 352, conductor screen 354, insulation 356, insulation screen 358, shield 360 (also referred to as sheath 360), and jacket 362. However, in some examples, electrical cables 350 may include more or fewer layers. It should be understood that the layers of cables 350 are not necessarily drawn to scale. Electrical cables 350 may be configured for AC and/or DC power transmission.

Electrical cables 350 may transmit voltages of 11 kV, 33 kV, 66 kV, 360 kV, as a few example voltages. In some instances, electrical cables 350 transmit electrical power between a power source and substation may transmit voltages of 360 kV or more, which may be considered a "transmission level voltage". In some examples, electrical cables 350 transmit voltages between 33 kV and 360 kV, such as 66 kV or 33 kV, which may be considered "sub-transmission-level voltages," and may provide electrical power from a power source to an end-user or customer (e.g., customers utilizing a relatively large amount of power). As another example, electrical cables 350 that transmit electrical power between a distribution substation and a distribution transformer may transmit voltages less than 33 kV, which may be considered "distribution-level voltages." Electrical cables 350 may also transmit electrical power between a distribution substation or distribution transformer (e.g., a pad-mount transformer or pole-mount transformer) and end-users or consumers (e.g., homes and businesses) and may transmit voltages between 360 volts and 240 volts, at such voltages electrical cables 350 may be called "secondary distribution lines."

Central conductor 352 includes a conductive material, such as copper or aluminum. In some examples, central conductor 352 includes a single solid conductor or a plurality of stranded conductors. A diameter or thickness of the central conductor 352 is based on the current that electrical cables 350 is designed to transmit or conduct. In other words, the cross-sectional area of central conductor 352 is based on the current that electrical cables 350 are designed to transmit. For example, central conductor 352 may be configured to transmit currents of 1,000 amperes or more.

Conductor screen 354 may include a semi-conductive polymer, such as carbon black loaded polymer. The semi-conductive polymer may have a bulk resistivity in a range from approximately 5 to approximately 100 ohm-cm. Conductor screen 354 may be physically and electrically coupled to central conductor 352. In the example of FIG. 3, conductor screen 354 is disposed between central conductor 352 and insulation 356. Conductor screen 354 may provide a continuous conductive surface around the exterior of central conductor 352, which may reduce or eliminate sparking that might otherwise be created by central conductor 352.

In some examples, insulation 356 includes polyethylene, such as a cross-linked polyethylene (which may be abbreviated as PEX, XPE, or XLPE) or an ethylene propylene rubber (which may be abbreviated as EPR) or High Performance Thermoplastic Elastomer (HPTE). A diameter or thickness of the insulation 356 is based on the voltage that electrical cables 350 is designed to transmit or conduct.

Insulation screen 358 may include a semi-conductive polymer similar to conductor screen 354. In some examples, insulation screen 358 is disposed between insulation 356 and shield 360. Insulation screen 358 may be coupled to insulation 356. In some examples, insulation screen 358 is electrically coupled to shield 360

Shield 360 may include a conductive material, such as a metal foil or film or wires. In some examples, shield 360 may be referred to as a "earth ground conductor."

Jacket 362, also referred to as an "oversheath," is an outer layer of electrical cables 350. Jacket 362 may be a plastic or rubber polymer, such as polyvinyl chloride (PVC), polyethylene (PE), or ethylene propylene diene monomer (EPDM).

Electrical cables 350 may include additional layers, such as a swellable or water blocking material placed within the conductor strands (e.g., a strand fill) or between various layers within electrical cables 350.

According to aspects of this disclosure, cable preparation device 50 includes computing device 52. In some examples, computing device 52 includes at least one processor 302, a communication unit 304, a power source 306, one or more sensors 308, and a storage device 310. FIG. 3B illustrates one example of a cable preparation device 50 and computing device 52. Many other examples of computing device 52 may be used in other instances and may include a subset of the components included in example computing device 52 or may include additional components not shown in the example computing device 52.

Computing device 52 includes one or more power sources 306 to provide power to components shown in computing device 52. In some examples, power sources 306 include a primary power source to provide electrical power and a secondary, backup power source to provide electrical power if the primary power source is unavailable (e.g., fails or is otherwise not providing power). In some examples, power source 306 includes a battery, such as a lithium ion battery.

One or more processors 302 may implement functionality and/or execute instructions within computing device 52. For example, processors 302 may receive and execute instructions stored by storage device 310. These instructions executed by processors 302 may cause computing device 52 to store and/or modify information, within storage devices 310 during program execution. Processors 302 may execute instructions of components, analytics engine 318, to perform one or more operations in accordance with techniques of this disclosure. That is, analytics engine 318 may be operable by processor 302 to perform various functions described herein.

One or more communication units 304 of computing device 52 may communicate with external devices by transmitting and/or receiving data. For example, computing device 52 may use communication units 304 to transmit and/or receive radio signals on a radio network such as a cellular radio network. Examples of communication units 304 include a network interface card (e.g. such as an Ethernet card), an optical transceiver, a radio frequency transceiver, a GPS receiver, or any other type of device that can send and/or receive information. Other examples of communication units 304 may include Bluetooth®, GPS, cellular (e.g., 3G, 4G), LPWAN, and Wi-Fi® radios. As another example, communications unit 304 may communicate with external devices by transmitting and/or receiving data via wired communication.

Computing device 52 may include one or more imaging devices, such as a camera or barcode scanner. For example, computing device 52 may include a plurality of cameras configured to take images of electrical cable 350 before, during, and/or after the layers of electrical cable 350 are cut.

One or more storage devices 310 may store information for processing by processors 302. In some examples, storage device 310 is a temporary memory, meaning that a primary purpose of storage device 310 is not long-term storage. Storage device 310 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage device 310 may, in some examples, also include one or more computer-readable storage media. Storage device 310 may be configured to store larger amounts of information than volatile memory. Storage device 310 may further be configured for long-term storage of information as non-volatile memory space and retain information after activate/off cycles. Examples of non-volatile memories include, flash memories, or forms of electrically programmable memories (EPROM) or electrically erasable and programmable (EEPROM) memories. Storage device 830 may store program instructions and/or data associated with components such as analytics engine 318.

In the example of FIG. 3, storage devices 310 include electrical equipment data repository 312, event data repository 314, models repository 316, and analytics engine 318. Data repositories 312, 314, and 316 may include relational databases, multi-dimensional databases, maps, and hash tables, or any data structure that stores data. In some examples, electrical equipment data repository 312 may be similar to, and may include data similar to, electrical equipment data repository 74A of FIG. 2. Likewise, event data repository 314 may be similar to, and may include data similar to, event data 74B as described in FIG. 2.

According to aspects of this disclosure, analytics engine 318 may be operable by one or more processors 302 to all or a subset of the functions of computing devices 42 and 52 described above in reference to FIG. 1 and EEMS 6 described above in reference to FIGS. 1 and 2.

Figure 4:
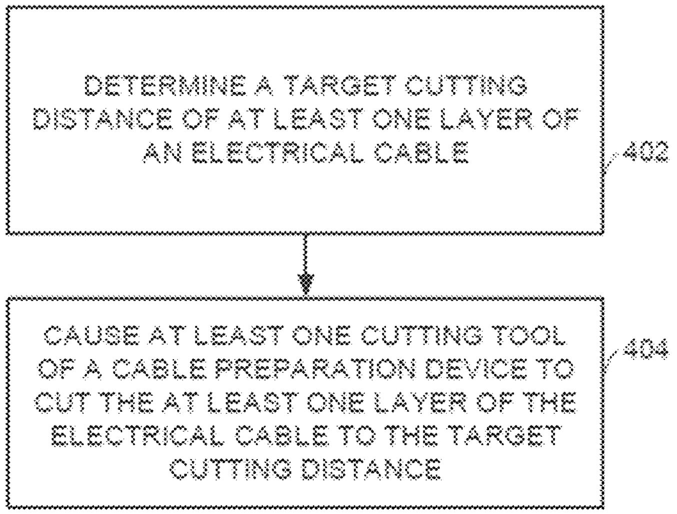
FIG. 4 is a flow chart illustrating example operations performed by a cable preparation device and one or more computing devices that are configured to control the cable preparation device, in accordance with various techniques of this disclosure.

FIG. 4 is a flow chart illustrating example operations performed by one or more systems that are configured to prepare electrical cables for installation in a power grid, in accordance with various techniques of this disclosure. FIG. 4 is described with reference to cable preparation device 50 and computing device 52 of FIG. 1. However, the operations of FIG. 4 may be performed by other cable preparation devices or computing devices.

In some examples, computing device 52 determines a target cutting distance of at least one layer of electrical cable 32A for preparing electrical cable 32A for installation in a power grid (402). The target cutting distance may include a target cutting depth or a target cutback distance.

Computing device 52 controls cable preparation device 50 to cause at least one cutting tool of cable preparation device 50 to cut the at least one layer of the electrical cable 32A to the target cutting distance (404). For instance, computing device 52 may cause cable preparation device 50 to cut various layers to the respective cutback lengths and cutting depths.

Figure 5:
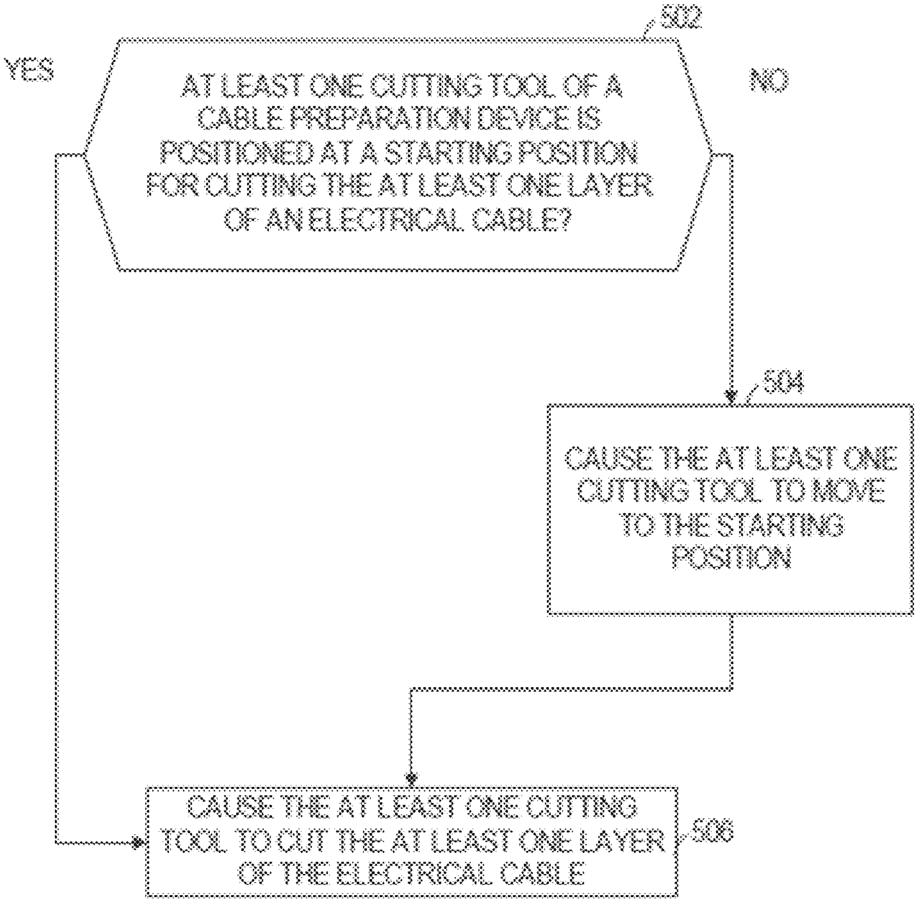
FIG. 5 is a flow chart illustrating example operations performed by a cable preparation device and one or more computing devices that are configured to control the cable preparation device, in accordance with various techniques of this disclosure.

FIG. 5 is a flow chart illustrating example operations performed by one or more systems that are configured to prepare electrical cables for installation in a power grid, in accordance with various techniques of this disclosure. FIG. 5 is described with reference to cable preparation device 50 and computing device 52 of FIG. 1. However, the operations of FIG. 5 may be performed by other cable preparation devices or computing devices.

In some examples, computing device 52 determines whether at least one cutting tool of electrical cable preparation device 50 is positioned at a starting position for cutting the at least one layer of electrical cable 32A (502). For example, a starting radial position may be located at a surface of a layer to be cut. As another example, a starting longitudinal position may be located at a longitudinal reference position (e.g., an end of electrical cable 32A).

Responsive to determining that the at least one cutting tool is not positioned at the starting position for cutting the at least one layer, computing device 52 causes the at least one cutting tool to move to the starting position (504). For example, computing device 52 may cause the at least one cutting tool to move radially or longitudinally to the starting radial or longitudinal position, respectively.

In some examples, computing device 52 causes the at least one cutting tool to cut the at least one layer of the electrical cable in response to determining that the at least one cutting tool is positioned at the starting position (506).

Figure 6:
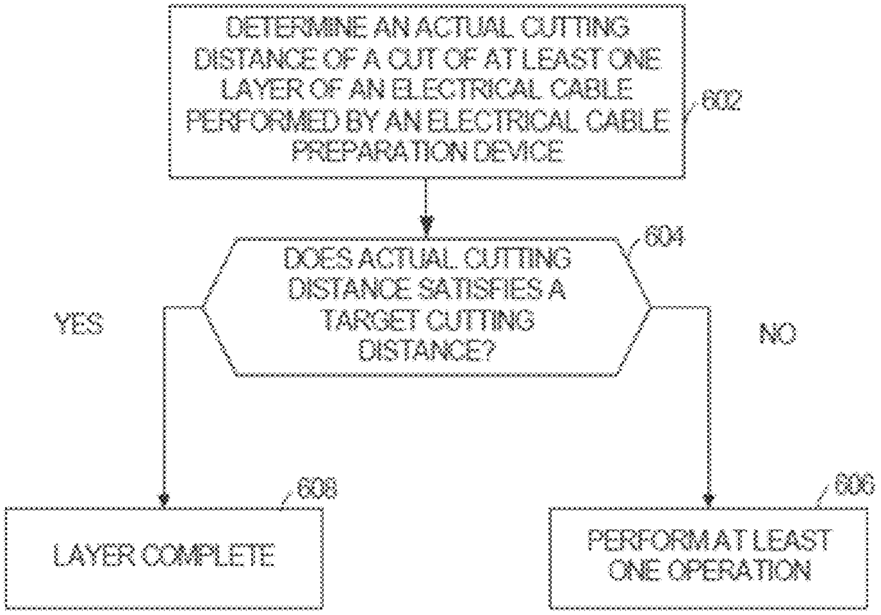
FIG. 6 is a flow chart illustrating example operations performed by a cable preparation device and one or more computing devices that are configured to control the cable preparation device, in accordance with various techniques of this disclosure.

FIG. 6 is a flow chart illustrating example operations performed by one or more systems that are configured to prepare electrical cables for installation in a power grid, in accordance with various techniques of this disclosure. FIG. 6 is described with reference to cable preparation device 50 and computing device 52 of FIG. 1. However, the operations of FIG. 6 may be performed by other cable preparation devices or computing devices.

Computing device 52 determines, in some examples, an actual cutting distance of a cut of at least one layer of an electrical cable 32A performed by electrical cable preparation device 50 (602). For example, computing device 52 may determine the actual cutting distance based on one or more images of electrical cable 32A during or after a cut. As another example, computing device 52 may determine the actual cutting distance based on an electrical resistance or capacitance during the cut.

In some examples, computing device 52 determines whether the actual cutting distance satisfies a target cutting distance (604).

Computing device 52 may perform at least one operation in response to determining that the actual cutting distance satisfies a target cutting distance (606). For instance, computing device 52 may cause cable preparation device 50 to re-cut one or more layers in response to determining that the actual cutting distance does not satisfy the target cutting distance. As another example, computing device 52 may cause cable preparation device 50 to move to a starting position for another layer in response to determining that the actual cutting distance satisfies the target cutting distance. If the actual cutting distance satisfies a target cutting distance, the cut for that layer may be complete (608) and computing device 52 may cause cable preparation device 50 to move to another layer or stop cutting layers if there are none left to be cut.

Figure 7:
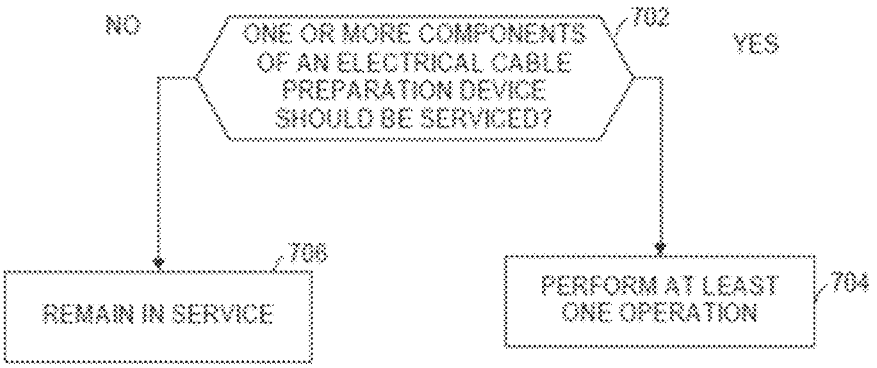
FIG. 7 is a flow chart illustrating example operations performed by a cable preparation device and one or more computing devices that are configured to control the cable preparation device, in accordance with various techniques of this disclosure.

FIG. 7 is a flow chart illustrating example operations performed by one or more systems that are configured to prepare electrical cables for installation in a power grid, in accordance with various techniques of this disclosure. FIG. 7 is described with reference to cable preparation device 50 and computing device 52 of FIG. 1. However, the operations of FIG. 7 may be performed by other cable preparation devices or computing devices.

Computing device 52 determines, in some examples, whether one or more components of an electrical cable preparation device 50 should be serviced (702). For example, computing device 52 may determine whether one or more of the cutting tools of cable preparation device 50 should be serviced (e.g., if the blades are dull).

Computing device 52 performs at least one operation in response to determining that the one or more components of the electrical cable preparation device should be serviced (704). For example, computing device 52 may schedule maintenance of cable preparation device 50, order replacement parts, etc. As another example, computing device 52 may output a notification to another computing device 52 or output an alert (e.g., audible, visual, haptic) indicating cable preparation device 50 should be serviced. Computing device 52 enables cable preparation device 50 to remain (706) in service in response to determining that components of the electrical cable preparation device do not need to be serviced. For example, computing device 52 may enable cable preparation device 50 to continue cutting layers of electrical cables.

Figure 8:
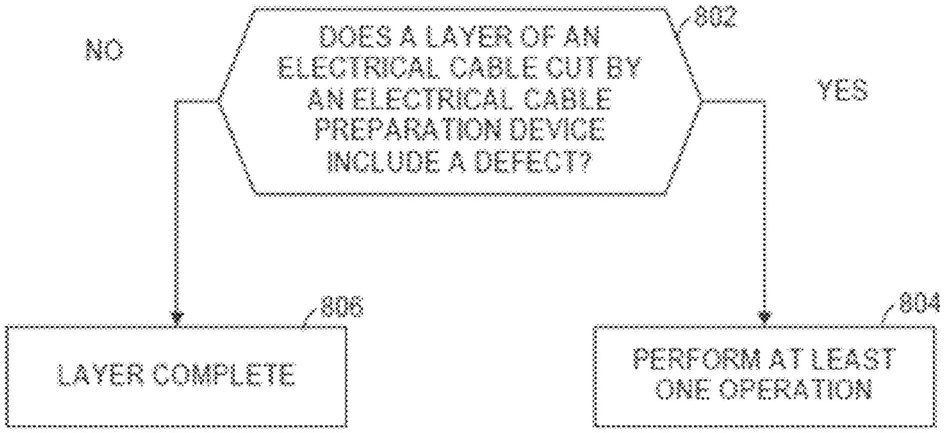
FIG. 8 is a flow chart illustrating example operations performed by a cable preparation device and one or more computing devices that are configured to control the cable preparation device, in accordance with various techniques of this disclosure.

FIG. 8 is a flow chart illustrating example operations performed by one or more systems that are configured to prepare electrical cables for installation in a power grid, in accordance with various techniques of this disclosure. FIG. 8 is described with reference to cable preparation device 50 and computing device 52 of FIG. 1. However, the operations of FIG. 8 may be performed by other cable preparation devices or computing devices.

In some examples, computing device 52 determines whether a layer of an electrical cable 32A cut by an electrical cable preparation device 50 includes a defect (802). For example, computing device 52 may determine whether the layers of electrical cable 32A were cut to the correct depth and/or cutback length. As another example, computing device 52 may determine whether a layer includes one or more cuts, gouges, or debris. Computing device 52 may determine whether the layers of electrical cable 32A include a defect based on one or more images of electrical cable 32A taken during or after the cable preparation by cable preparation device 50.

Computing device 52 performs at least one operation in response to determining that the layer includes the defect (804). As one example, computing device 52 controls the electrical cable preparation device 50 to correct the defect. For example, computing device 52 may cause cable preparation device 50 to re-cut one or more layers. As another example, computing device 52 may cause a vacuum or blower to remove debris from electrical cable 32A. As yet another example, computing device 52 may output a notification or alert indicative of the defect.

If computing device 50 determines that the layer does not include a defect, the cut for that layer may be complete (806) and computing device 52 may cause cable preparation device 50 to move to another layer or stop cutting layers if there are none left to be cut.

Figure 9:
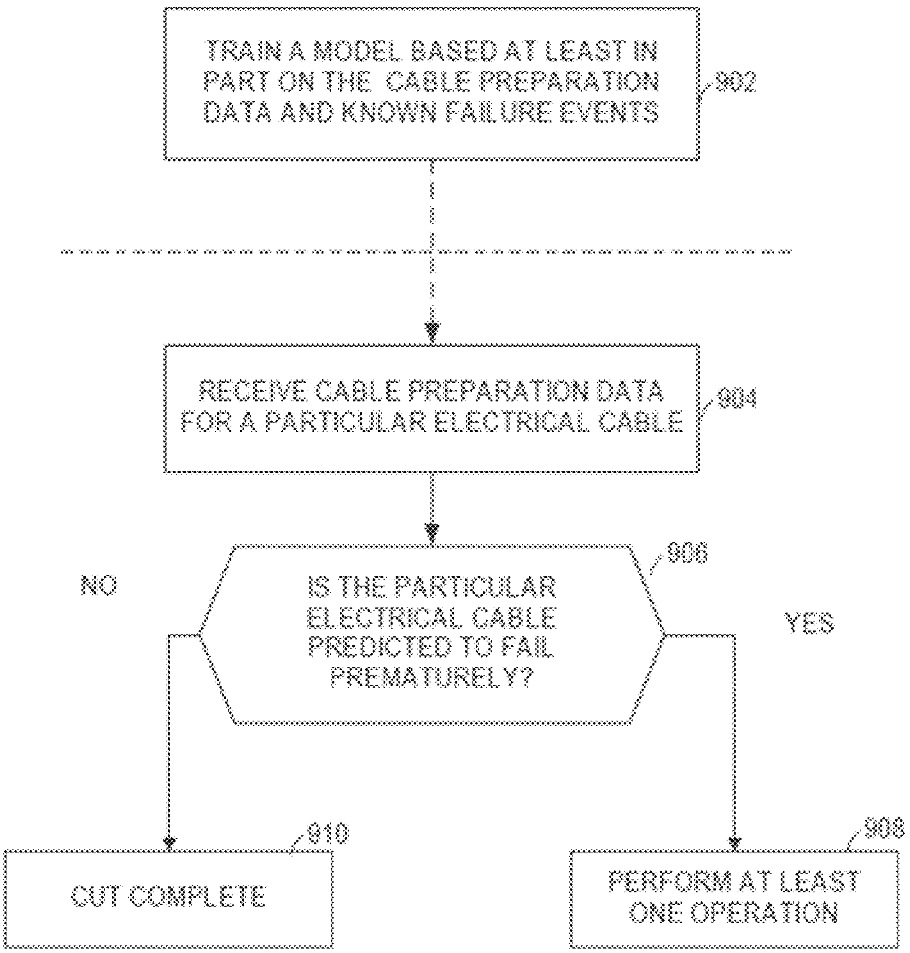
FIG. 9 is a flow chart illustrating example operations performed by a cable preparation device and one or more computing devices that are configured to control the cable preparation device, in accordance with various techniques of this disclosure.

FIG. 9 is a flow chart illustrating example operations performed by one or more systems that are configured to prepare electrical cables for installation in a power grid, in accordance with various techniques of this disclosure. FIG. 9 is described with reference to cable preparation device 50 and computing device 52 of FIG. 1. However, the operations of FIG. 9 may be performed by other cable preparation devices or computing devices.

In some examples, computing device 52 trains a model using cable preparation data for a plurality of electrical cables 32 and known failure events associated with the plurality of electrical cables 32 (902).

Computing device 52 may receive cable preparation data for a particular electrical cable 32A having one or more layers cut by a particular electrical cable preparation device 50 (904).

In some examples, computing device 52 applies the model to the cable preparation data for the particular electrical cable 32A to determine or predict whether the particular electrical cable 32A will fail prematurely (906).

Computing device 52 performs at least one operation in response to determining that the particular electrical cable 32A will fail prematurely (908). For example, computing device 52 may output a notification or alert indicating electrical cable 32A will fail prematurely. As another example, computing device 52 may cause cable preparation device 52 to re-cut electrical cable 32A. If computing device 50 predicts that the electrical cable is will not fail prematurely (910), computing device 50 determines that the cut is complete (e.g., that electrical cable 32A is ready to be installed).

Figure 10:
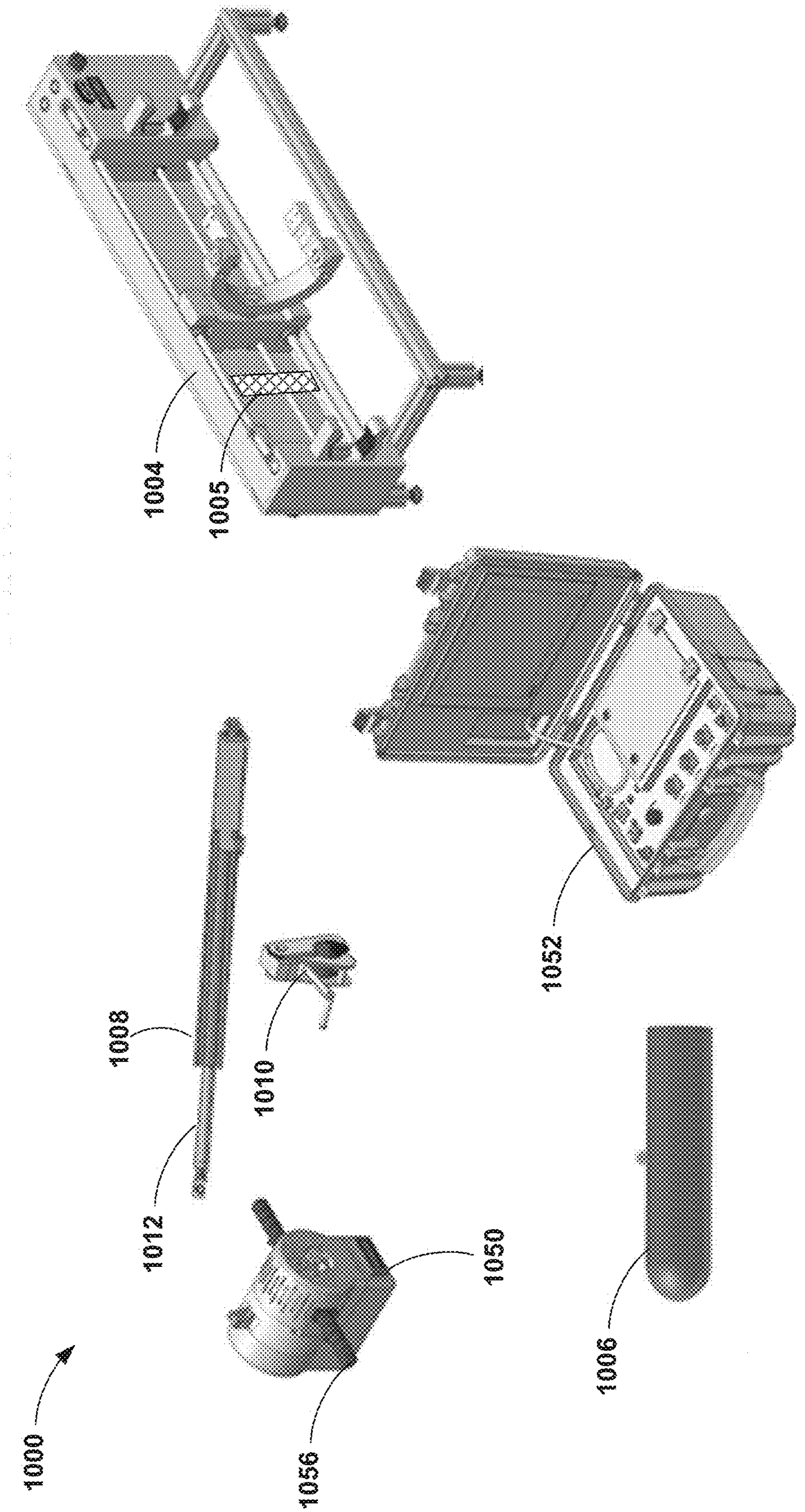
FIG. 10 is a conceptual diagram illustrating an example cable-preparation system.

FIG. 10 is a conceptual diagram of a modular cable preparation system 1000 to prepare electrical cables for installation to an electrical grid in accordance with various techniques of this disclosure. Cable preparation system 1000 may be integrated into a single housing (e.g., single device) or used as two or more discrete modules. In some examples, cable preparation system 1000 may be modular and can be used in a handheld mode or mounted on a base 1004 ("sledge"). Several modules make up the entire cable preparation system 1000, but not all are used for a given cable preparation, with the choice of sledge or handheld depending on the application and preference. Cable preparation system 1000 is constructed of several separate modules, including: interface and control module (ICM) 1052, cable preparation device 1050, sledge module (HSM) 1004, handle module (HM) 1056, cross-section sensing module (CSSM) 1006 and piston module (PM) 1008.

In some examples, a handheld cable preparation device 1050 can be mounted to a gimbal mounting of base 1004, the gimbal mounting having two degrees of freedom to allow the cable preparation device 1050 to follow a bent cable. In some examples, the position of the handheld cable preparation device 1050 in the base 1004 can be reversed. In some examples, the base 1004 has a translation motor to move cable preparation device 1050 (or a cutting head thereof) along the cable so that the cutback is controlled and can be adjusted in concert with the rotational cutting to provide desired helical and circular cutting.

In some examples, the modules further include an axial sensing module 105 for post preparation quality validation and documentation. The axial sensing module 105 may include cameras mounted to HSM 104 to examine the prepared cable along the longitudinal axis of the cable. Axial sensing module 105 can be a separate module similar to CSSM 106 or can be camera mounted in the HSM 104. In some examples, axial sensing module 105 may be used to image the end of cable 350 and/or longitudinal long of cable 350 in at least one rotational position, for example, to identify defects in the prepared cable 350.

The modular concept separates some elements, so the operator has a small lightweight handheld unit; cable preparation device 1050. Sledge 1004 provides stability and functionality if space is not a constraint. One or more components of cable preparation system 1000 wireless communication can be used to send data from one module to another. Some components within the modules can be removed and integrated with other modules. Further, there can be multiple combinations of all of modules 1050, 1052, 1004, 1056, 1006 and 1008. For example, cable preparation device 1050 is configured to be both handheld; with handheld module 1056 and sledge mounted; with sledge module 1004.

ICM 1052 can provide a main operator interface, a power supply, processing, battery, motor power supplies and a display and user interface. CSSM 1006 can have a camera, sensors, indicators and lighting for visual measurement of cable layer diameter and thickness. Cable preparation device 1050 is discussed in detail below. Piston module 1008 configured to engage a cable (e.g., cable 350) to support cable preparation device 1050 and, in some examples, enable axial motion for handheld operation. Piston module 1008 can have a clamp 1010 and a linear drive 1012. Sledge module 1004 provides support and axial motion for operation. For example, sledge module 1004 may include a mounting gimbal, linear drive, stand, cable clamps controls (e.g., jog, start, stop), and/or brackets to support floor, wall, bucket, or other mounting options.

Cable preparation device 1050 may be the same as or substantially similar to cable preparation device 50 discussed above in reference to FIGS. 1-3. For example, cable preparation device 1050 is configured to remove one or more layers of a cable 350 by adjusting and rotating blades (discussed in greater detail below) around the cable 350; while providing sensor feedback to a control system. Cable preparation device 1050 can be used in a handheld or sledge mounted fashion. Cable preparation device 1050 (with handle module 1056) is modular and can be used in a handheld mode or can be used mounted on a base ("sledge"). On the sledge 1004, the axial motion along the cable 350 may be provided by the sledge 1004. In handheld use, the axial motion along the cable 350 may be achieved by controlling the pitch of the blade removing the cable jacket 362 and insulation 356. A piston module 1008 is utilized for the removal of the conductor screen 354. Cable preparation device 1050 controls a plurality of blades, such as, for example, three blades of each of the cable jacket, insulation and insulation screen. The cable preparation module 1050 can adapt to a plurality of cable size ranges, such as two or more cable size ranges, by changing out blade holders performed by an operator. The cable preparation module 1050 includes a roller mechanism radially closing on the cable 350 and securing it during cable preparation.

Several modules make up the entire system 1000, as discussed in reference to FIG. 10, but not all are modules are used for a given cable 350 preparation. An operator may have the choice of using the sledge 1004, for example, when space is not a constraint or, in other example, using cable preparation device 1050 in a handheld mode when workspace is limited, depending on the application, e.g., considering safety, operator preference, or the like. The modular concept separates some elements, so the operator has a small lightweight handheld cable preparation device 1050. The sledge 104 provides stability and functionality if space is not a constraint. However, when space becomes a constraint, then handheld cable preparation device 1050 can be just as functional.

Figure 11:
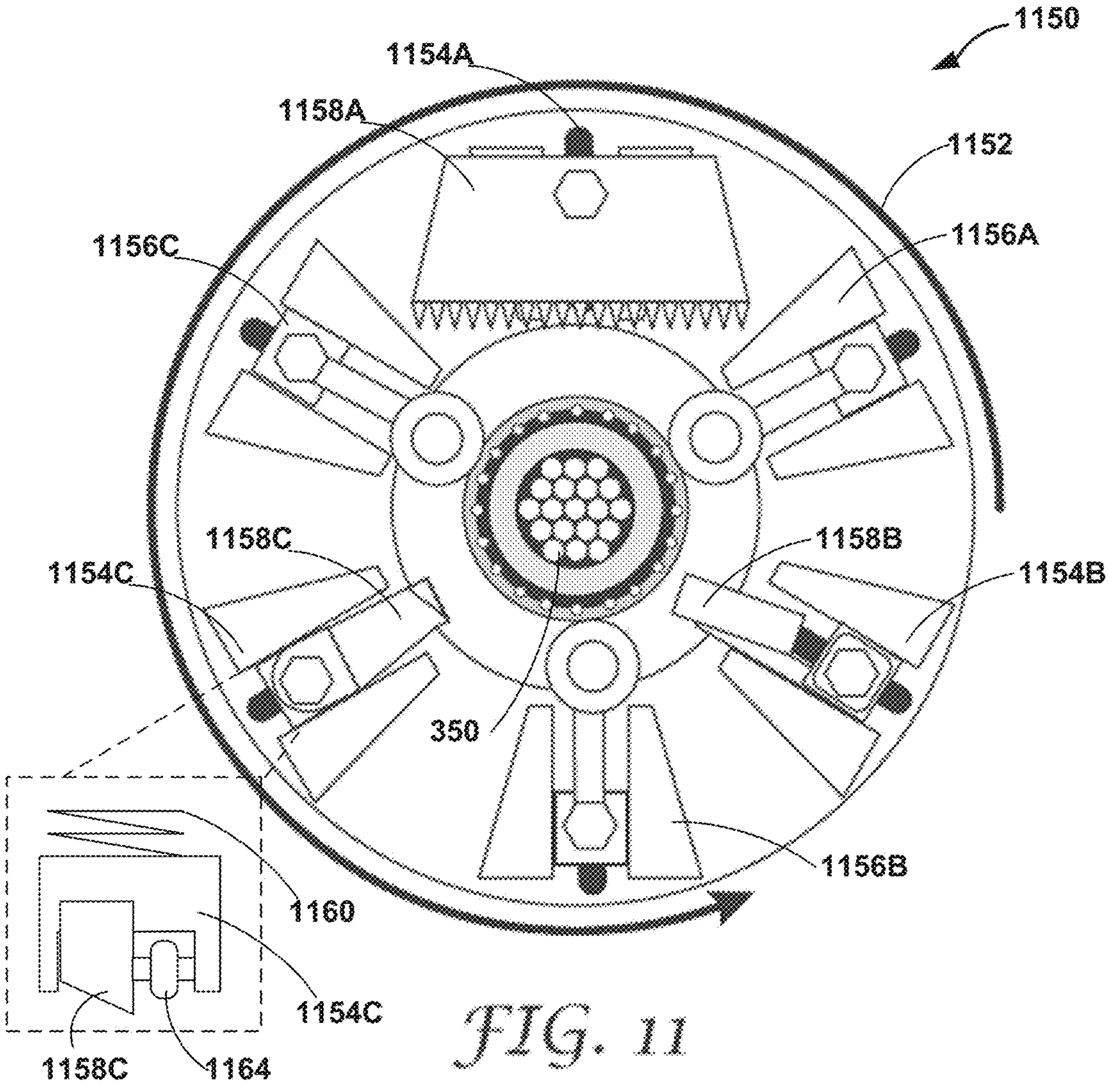
FIG. 11 is a conceptual diagram illustrating a cross-section of an example cutting head arrangement for a cable-preparation device, in accordance with various techniques of this disclosure.

FIG. 11 depicts a cross-sectional view of an example cutting head 1152 of a cable-preparation device 1150 with tool mounts 1154A-1154C, centering rollers 1156A-1156C, and cutting tools 1158A-1158C, in accordance with various techniques of this disclosure. In some examples, various cutting tools 1158A-1158C can be attached to tool mounts 1154A-1154C for modifying the cable. In some examples, cutting tool 1158A may include a blade for cutting a cable jacket or other tough or resilience polymeric material. Cutting tool 1158B may include a blade for shaving, such as shaving an insulation screen of a cable. Cutting tool 1258C may include a spiral cut blade for removal of the jacket, insulation, and insulation screen of a cable. Each of centering rollers 1156A-1156C and cutting tools 1158A-1158C may be moveable in a radial direction to accommodate different cable sizes and/or adjust a cut depth. For example, centering rollers 1156A-1156C and cutting tools 1158A-1158C are configured to be adjusted manually, automatically, and with springs to provide, for example, a selected cutting depth, cutting force, or the like. For example, cutting tool 1158C is coupled to cutting head via spring assembly 1160. Spring assembly is configured to enable cutting tool 1158C to follow a contour of cable 350 that is not uniform (e.g., cable ovality and eccentricity). To provide consistent score depth, the radial setting of cutting tool 1158C is control by the known radius of the insulation screen surface via depth setting member 1164 or a torque and/or force feedback via spring assembly 1160. Depth setting member 1164 may include a roller assembly configured to roll over a surface of cable 350. In other examples, depth setting member may include a domed or otherwise smooth surface configured to contact a surface of cable 350 from which at least a cutting surface of cutting tool 1158C protrudes. For example, a cutting surface of cutting tool 1158C may protrude through an apex of a domed depth setting member 1164.

In some examples, cable preparation device 1150 may include one or more clamps configured to clamp a cable by applying a force to the cable in a radial inward direction, e.g., by a metal or plastic foot, to prevent rotation of the cable and/or axial movement of cutting head 1152. In some examples, the one or more clamps may be configured to enable cutting head to finish a cut around a circumference of a cable without blades (e.g., blades at a pitch relative to the axis of the cable) causing movement of the cutting head 1152.

Figure 12:
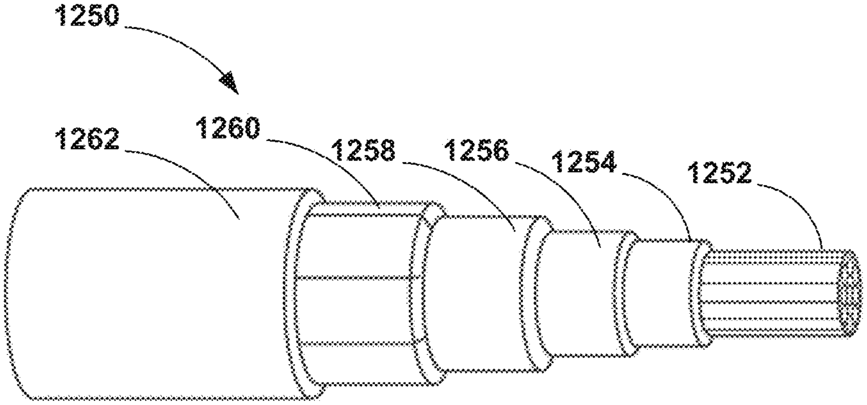
FIG. 12 is a conceptual diagram illustrating an example extruded medium voltage cable components, in accordance with various techniques of this disclosure.

FIG. 12 is a conceptual diagram illustrating an example extruded medium voltage cable 1250, in accordance with various techniques of this disclosure. Medium voltage cable 1250 may be the same as or substantially similar to cable 350 discussed above in reference to FIG. 3A. For example, cable 1250 includes central conductor 1252, conductor screen 1254, insulation 1256, insulation screen 1258, shield 1260 (also referred to as sheath 1260), and jacket 1262. In some examples, cable 1250 may include fewer layers or additional layers, such as, for example, one or more swellable or water blocking materials that are placed within the conductor strands (strand fill) or between various layers within the construction. The semi-conductive materials generally have bulk resistivities that range from 5 to 100 ohm-cm depending on composition. (Paper-insulated lead cable is an alternate legacy cable construction that uses oil impregnated paper as the insulation and a lead sheath as the metal sheath).

Figure 13:
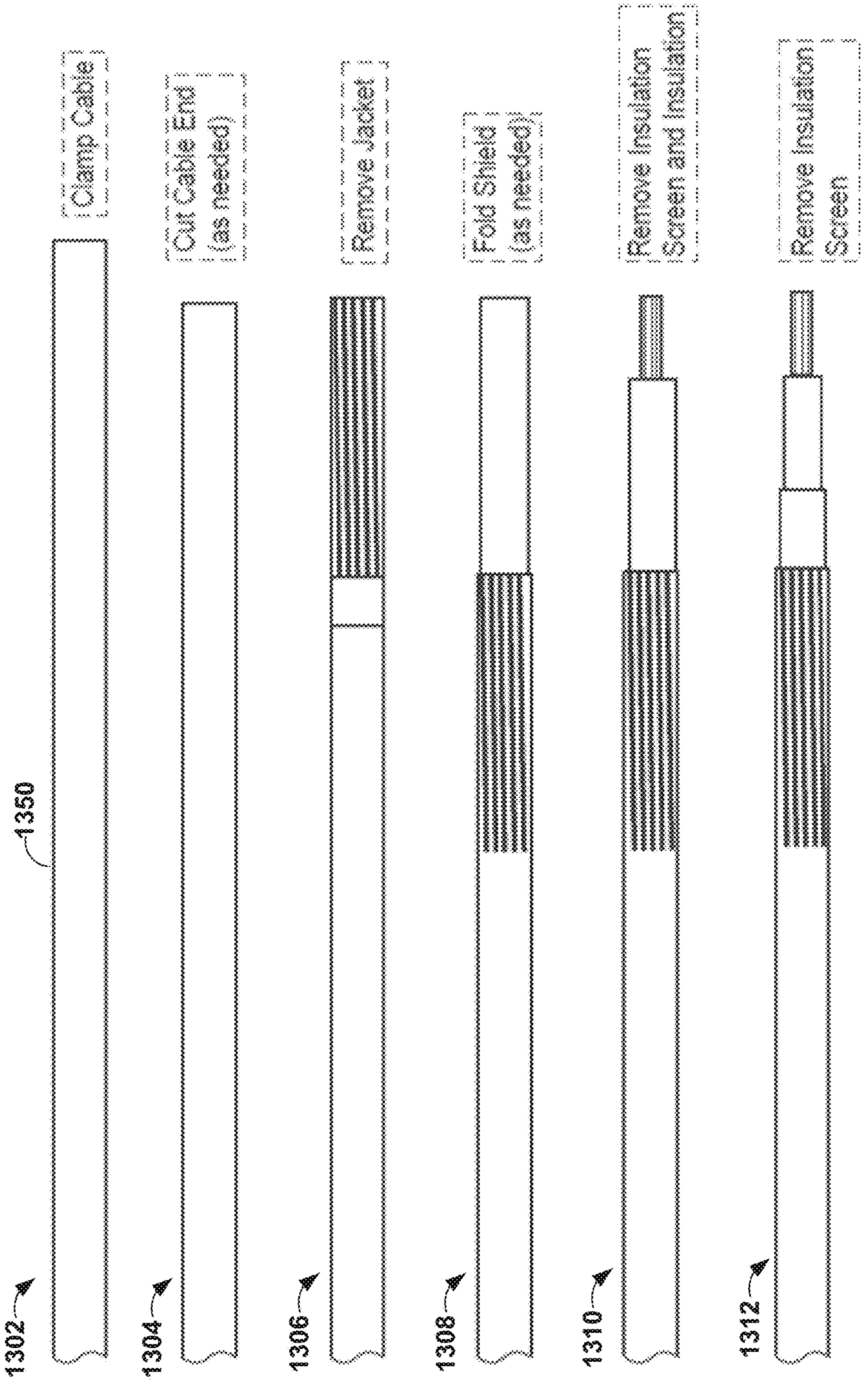
FIG. 13 is a conceptual diagram illustrating an example of a method of preparing an end of an electrical power cable in accordance with various techniques of this disclosure.

FIG. 13 is a conceptual diagram illustrating an example of a method of preparing an end of an electrical power cable 1350 using a cable preparation system, e.g., cable preparation system 1000, in accordance with various techniques of this disclosure. In step 1302, cable 1350 is clamped or otherwise mounted to a cable preparation device, e.g., cable preparation device 1050. In optional step 1304, a terminal end of cable 1350 is cut substantially perpendicular to an axis of cable 1350. In step 1306, a jacket of cable 1350 is removed. In step 1308, a shield (e.g., wire, foil, or other shield material) of cable 1350 is folded back over the uncut jacket. In step 1310, the insulation screen and insulation of cable 1350 is removed to expose the central conductor. In step 1312, a second portion of the insulation screen is removed to expose a portion of the insulation. In some examples, a terminal portion of the cable jacket may be left on the cable to provide an uncut portion of the cable jacket to which a clamp or other stabilizing device may be attached prior to cutting one or more layers of cable 1350.

Figure 14:
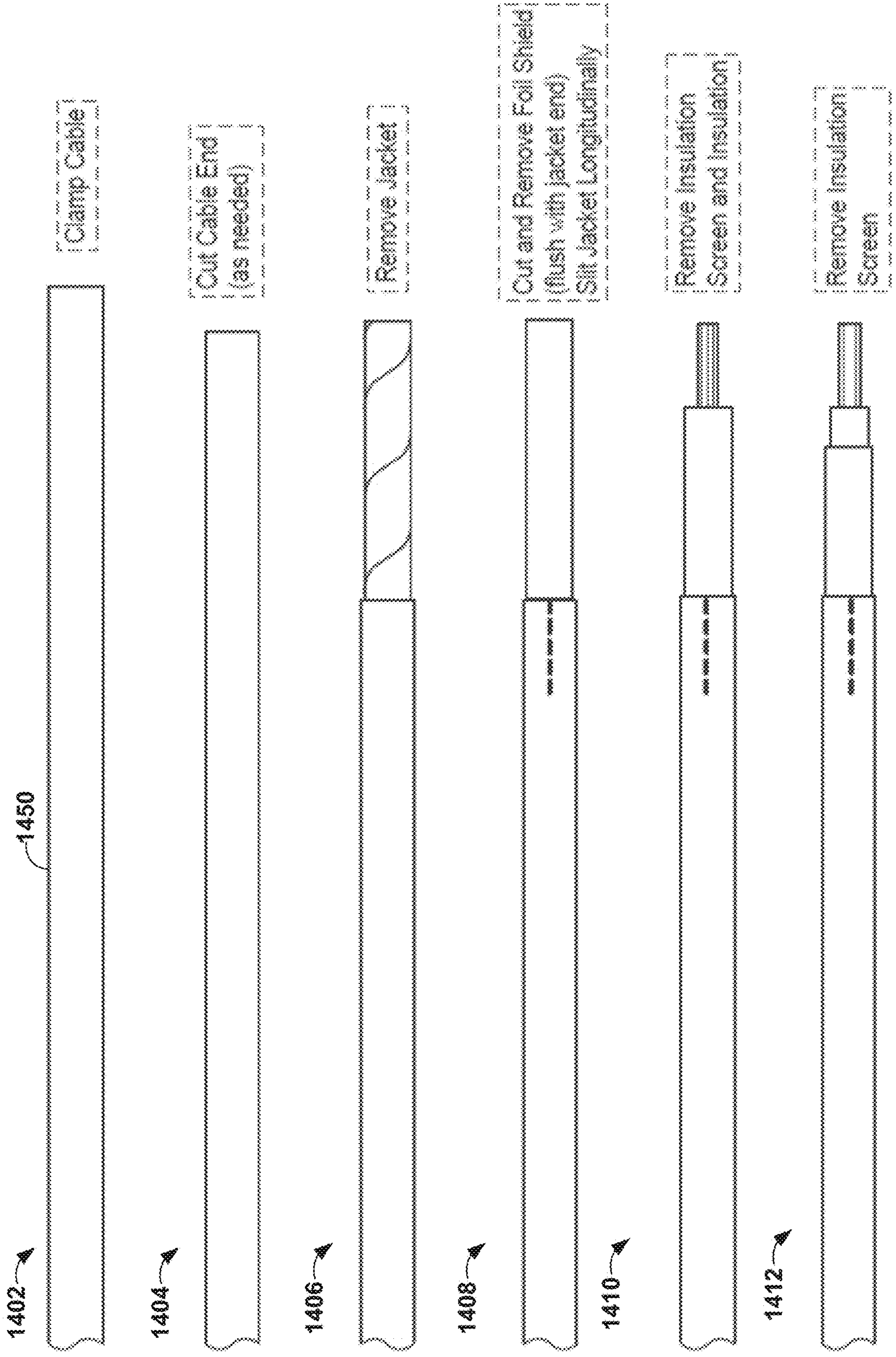
FIG. 14 is a conceptual diagram illustrating an example of a method of preparing an end of an electrical power cable, in accordance with various techniques of this disclosure.

FIG. 14 depicts another example of a method of preparing an end of an electrical power cable 1450. The method illustrated in FIG. 14 may be the same or substantially similar to the method of FIG. 13, except for the differences described herein. For example, in step 1402, cable 1450 is clamped or otherwise mounted to a cable preparation device, e.g., cable preparation device 1050. In optional step 1404, a terminal end of cable 1450 is cut substantially perpendicular to an axis of cable 1450. In step 1406, a jacket of cable 1450 is removed. In step 1408, a shield (e.g., wire, foil, or other shield material) of cable 1450 is cut flush with the uncut jacket. In step 1410, the insulation screen and insulation of cable 1450 is removed to expose the central conductor. In step 1412, a second portion of the insulation screen is removed to expose a portion of the insulation. Subsequently, a shield contactor (also known as a "cheese grater") may be positioned under the jacket in electrical contact with the shield.

Figure 15:
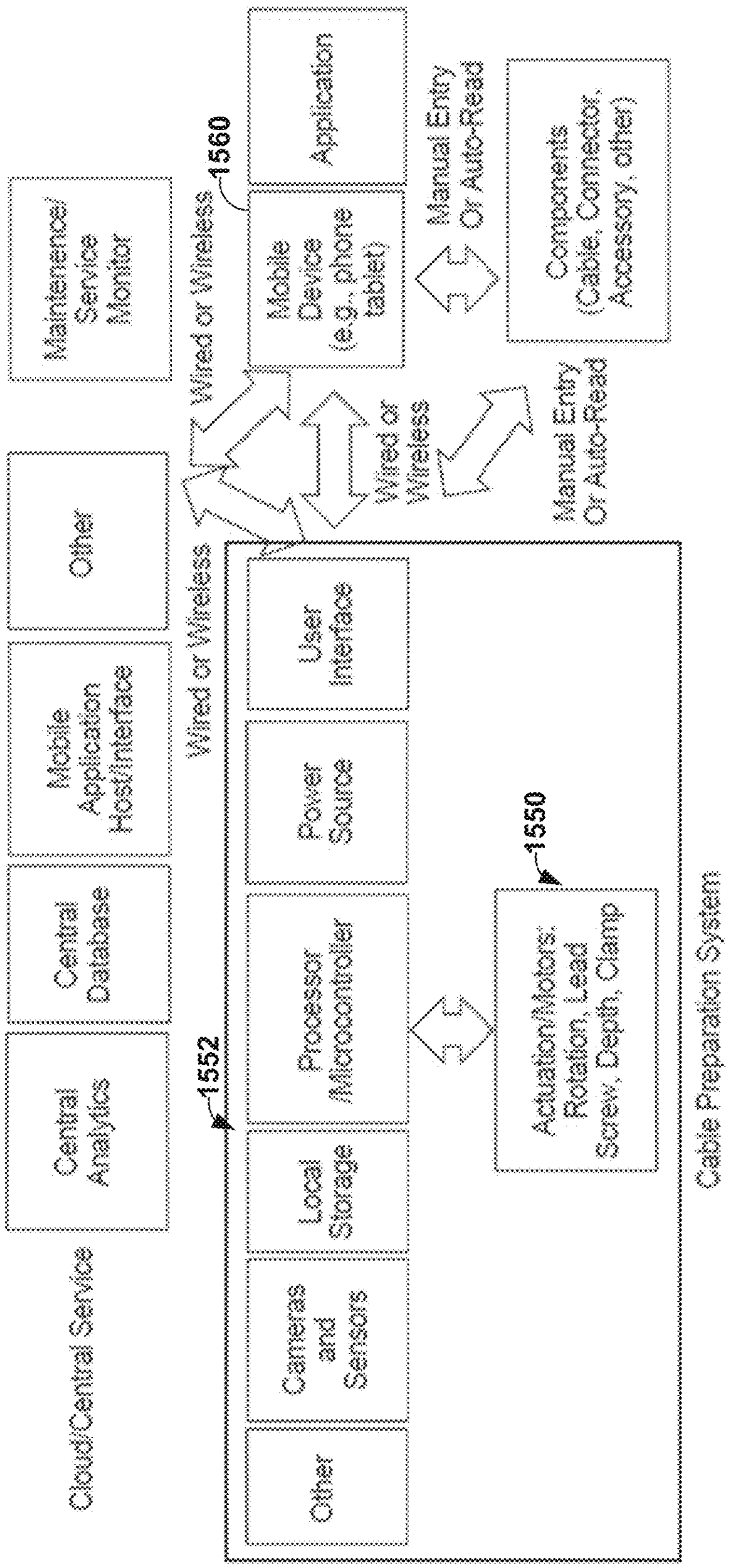
FIG. 15 is a conceptual diagram illustrating example connections between components of a cable-preparation system.

FIG. 15 is a conceptual diagram illustrating an example cable preparation system 1500 including a cable-preparation device 1550, computing device 1552, and central system 1506 in accordance with various techniques of this disclosure. Cable preparation device 1550, computing device 1552, and central system 1506 may be the same as cable preparation device 50, computing device 52, and EEMS 6 discussed above in reference to one or more of FIGS. 1-3. As discussed above in reference to FIG. 1-3, components of cable preparation system 1500 may be communicatively coupled via one or more wired or wireless connections. For example, as illustrated in FIG. 15, actuators/motors of cable preparation device 1550 are communicatively couple to one or more processors of computing device 1552. Computing device 1552 is communicatively coupled to one or more of central system 1506 (e.g., cloud/central service), mobile devices 1560, and/or one or more other external components such as connector accessories or the like. Additionally, or alternatively, central system 1506 may be communicatively coupled to mobile devices 1560. Additionally, or alternatively, mobile devices 1560 may be communicatively coupled to one or more other external components.

Figure 16A:
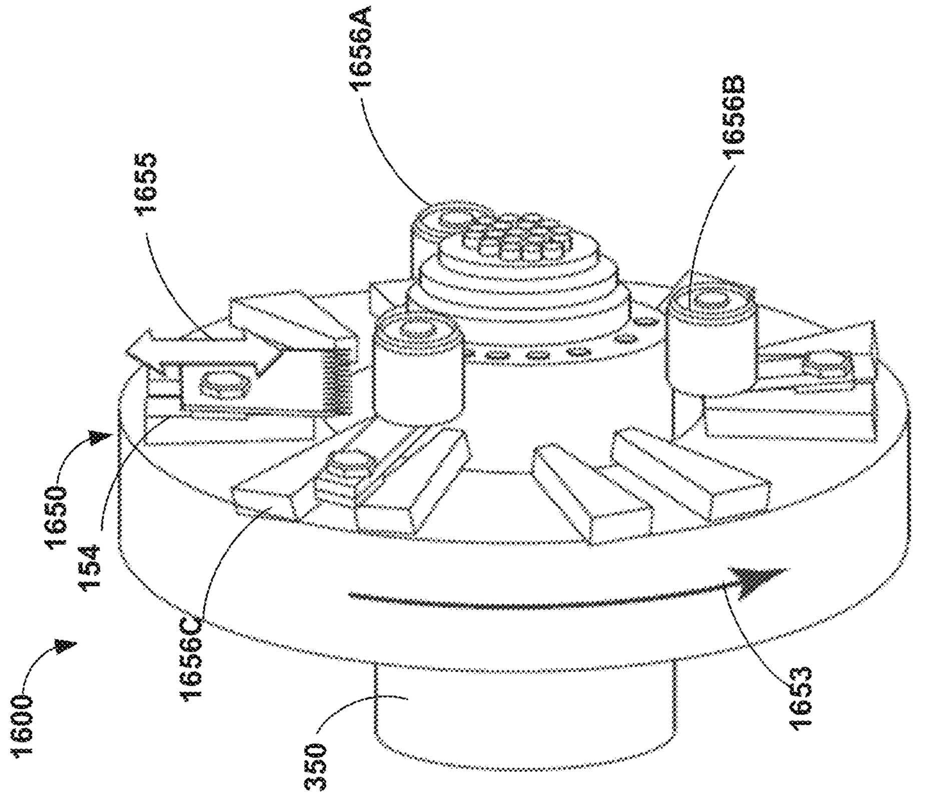
FIGS. 16A and 16B are conceptual diagrams illustrating oblique views of an example cutting head of a cable-preparation device configured with a camera in accordance with various techniques of this disclosure.
Figure 16B:
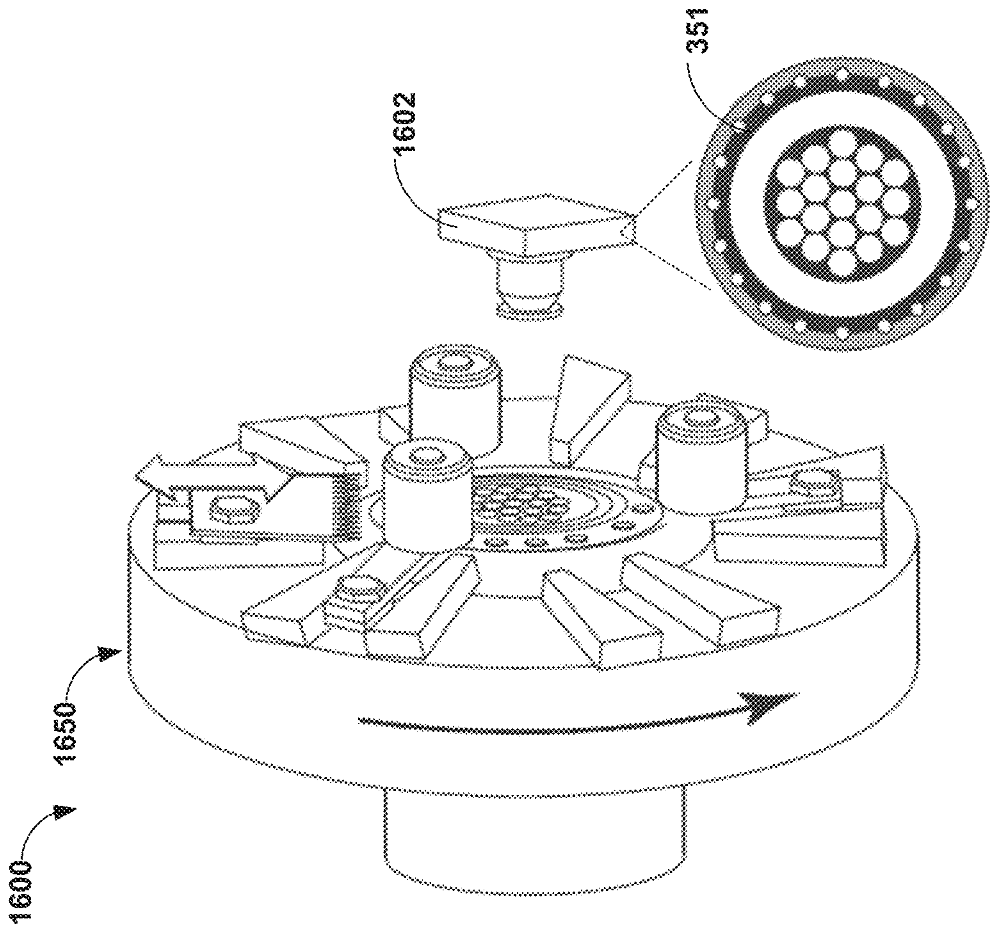

FIGS. 16A and 16B are conceptual diagrams illustrating oblique views of an example cable-preparation system 1600 that includes cable preparation device 1650 and camera 1602. Cable preparation device 1650 is the same as the cable preparation devices discussed above, such as cable preparation device 50. For example, cable preparation device 1650 includes cutting blade 1654 and rollers 1656A-1656C. Cutting blade 1654 is configured to move in the directions illustrated by arrows 1655. Cutting blade 1654 is configured to rotate in the direction illustrated by arrow 1653 to cut cable 350. Camera 1602 is configured to image the end 351 of a cut electrical power cable 350 in accordance with various techniques of this disclosure. The cable end 351 can be cut with the device to create an undeformed surface, which can be referenced as the cable end for cutbacks, and can be imaged. The image data can be analyzed to determine cable dimensions and type. In some examples, cable preparation system 1600 may use the image data to prepare the cable 350 with selected cut backs of one or more layers of cable 350.

Figure 17A:
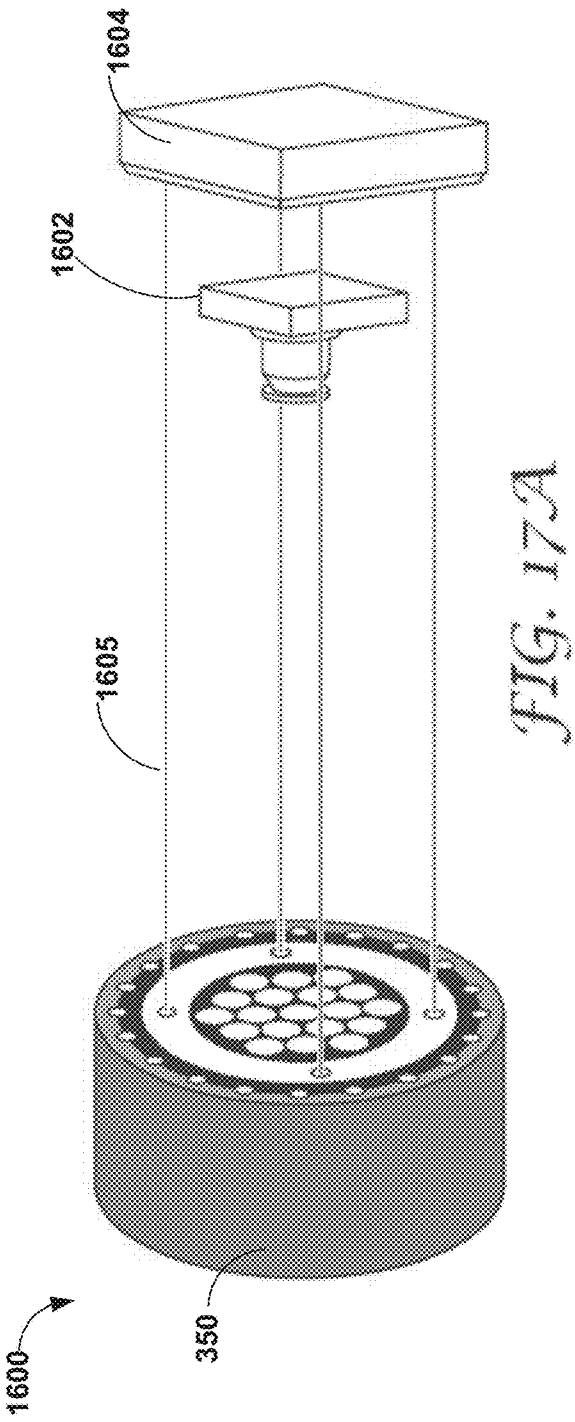
FIGS. 17A and 17B are conceptual diagrams illustrating an example cable-preparation system configured with laser measurements in accordance with various techniques of this disclosure.
Figure 17B:
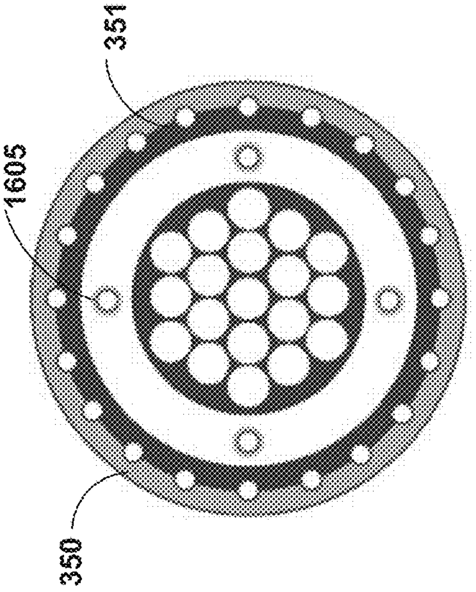

In some examples, cable preparation system 1600 may include dimension analysis devices. For example, FIGS. 17A and 17B are conceptual diagrams illustrating an example cable-preparation system 1600 configured with a laser measurement device 1604. Laser measurement device 1604 is configured to project a spot pattern 1605 on to a cable end 351 to have a reference dimension in a camera image enabling analysis of the image for other dimensions. In some examples, spot pattern 1605 may be projected on a reflective portion of cable 350, such as a white insulator of cable 350.

Figure 18:
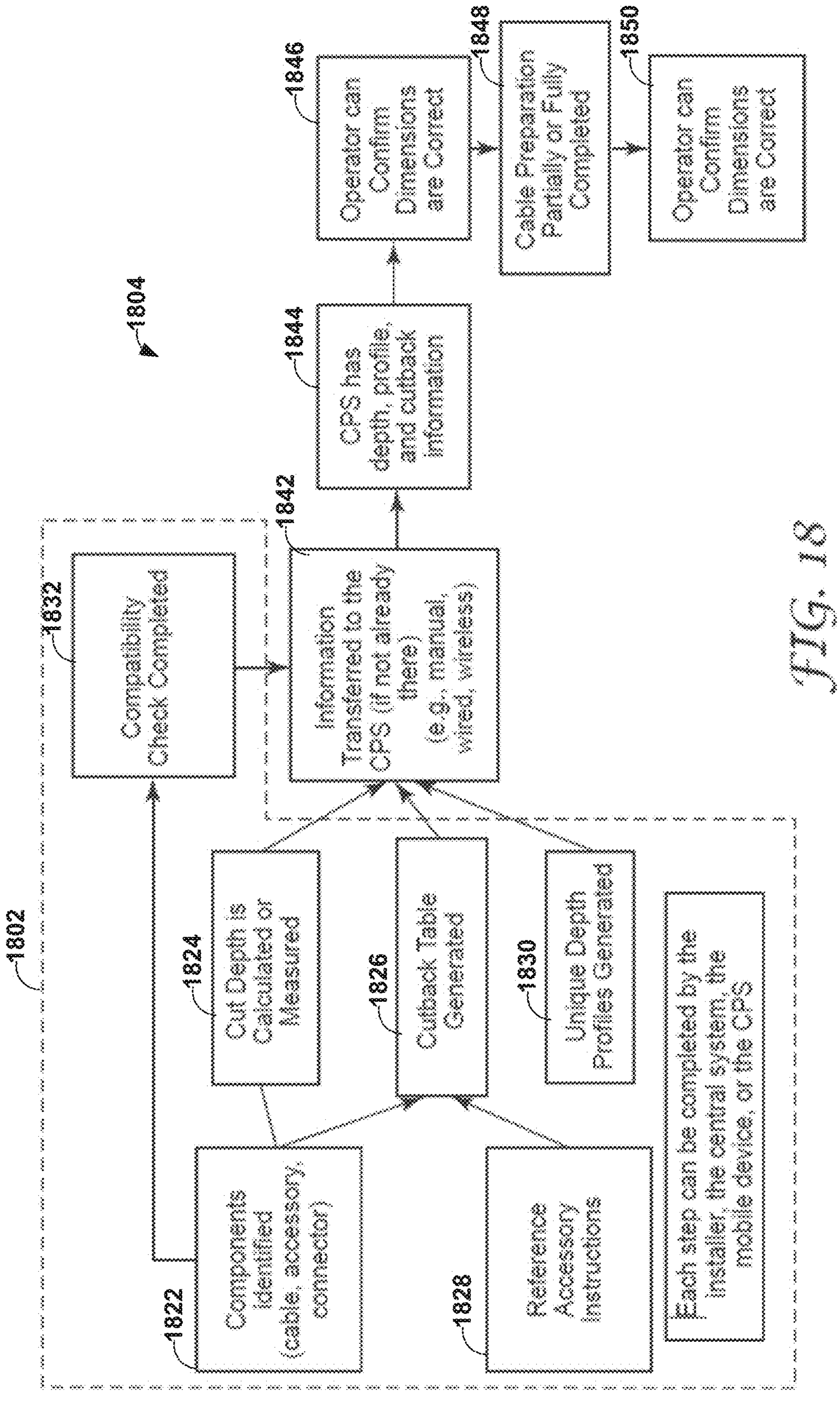
FIG. 18 is a conceptual diagram illustrating an example method of transferring cut dimensions into a cable-preparation system in accordance with various techniques of this disclosure.

FIG. 18 is a conceptual diagram illustrating an example method of transferring cut dimensions into a component of a central system, such as a cable-preparation system, a computing device, a mobile device, or other external components. For example, the central system, the mobile device, the operator, or the cable-preparation system can perform any one of the functions in the dashed box 1802. Those functions include, but are not limited to, identifying components (such as, a cable, an accessory, a connector, or the like) (1822); measuring or calculating a cut depth (1824); generating a cutback table (1826); referencing accessory instructions (1828); generating unique depth profiles (1830); and/or checking for compatibility (1832). Each of functions 1802 may be completed by an operator, a central system, a mobile device, of the cable preparation system (CPS) Subsequently, data may be transferred from any of the central system, the mobile device, or the operator (e.g., via a user interface) to the cable-preparation system (CPS), such as via a cloud-based platform, to perform the functions described in boxes 1804. The functions performed, e.g., at the CPS may include receiving the data, may include comparing the data (e.g., cable depth profiles, cable cutback distances, or the like) to reference tables (1842 and 1844), confirming cable dimensions (1846 and 1850); relaying cable preparation status (e.g., partial or complete) (1848); and iteratively repeat data analysis until confirming that the cable is properly prepared (e.g., relative to selected cutback information for a particular cable).

In some examples, the data analysis may include determining the radial and axial position (calibration) of a cutting tool relative to a cable or cable-preparation device. In some examples, the data analysis may include determining the position of a cutting tool tip relative to a cable. For example, the cutting tool is positioned so that when moved radially it will impinge on the cable surface or in-process surface. The radial location is measured as is the applied force (or a correlated parameter such as current). The force vs. distance curve can then be used to determine the cable surface relative to the tool. This can be done for several positions around the cable as needed. In some examples, the data analysis may include calibrating the radial position of cutting tools relative to an electrical power cable and tool head or a cutting tool relative to a cable-preparation device. In some examples, the data analysis may include determining when an insulation screen has been removed from a cable, using combination of sensors and cutting-tool control.

Figure 19:
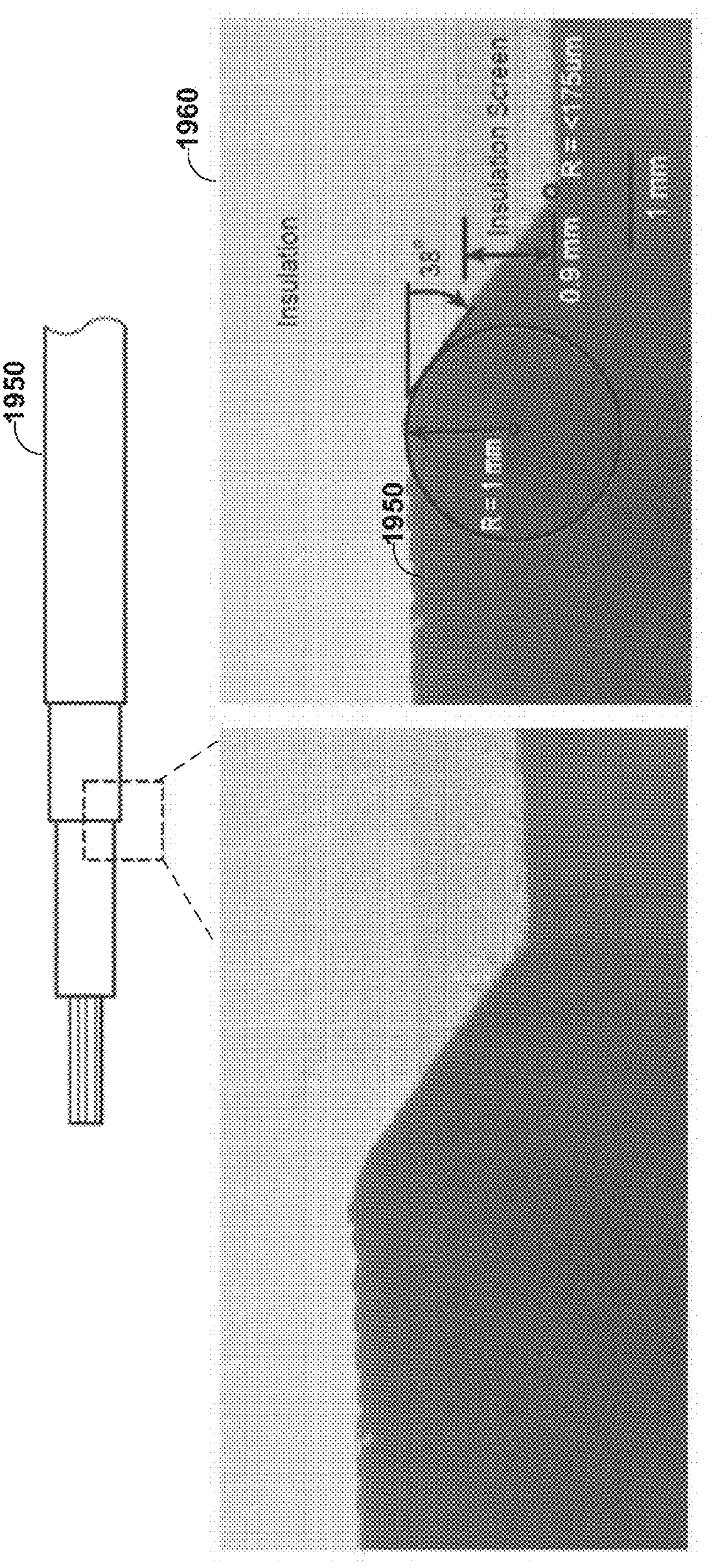
FIG. 19 is a conceptual diagram illustrating a cross section of an example electrical power cable transition region in accordance with various techniques of this disclosure.

FIG. 19 is a conceptual diagram illustrating an example transition region in cross section created by a cable preparation system. The example cable 1950 includes a Nexans NA2XS(F)2Y 12/20 1×120 RM/16 cable with XLPE insulation. The insulation is cutback using an example cable preparation device as described herein at an angle of about 38-degree relative to the axis of the cable. Although illustrated as a substantially straight taper, in other example, the taper may be curved or have other shapes. In some example, cutting the insulation as an angle may aid in subsequent processing of the cable (e.g., reduce or eliminate need to apply grease or other compounds) and/or reduce the failure rate of the cable when put into service by, for example, reducing inclusion of air gaps in splices or the like which may result in partial discharge events. For example, insulation 1960 of an accessory, such as a cable splice, may confirm better to the angled surface of cut cable 1950 compared to a non-angled cut.

In some examples, reducing air gaps using tapers may reduce a need to grease or other compounds to be applied to an insulation surface and the transition step between the insulation and the insulation screen. Typical installations require a grease or compound be applied to the insulation surface and the transition step between the insulation and insulation screen. The primary reason is to fill air voids at the insulator surface accessory surface, and transition region so that partial discharge is eliminated/minimized. Other reasons for grease are as a friction reducer for push on splices. In some examples, a cable preparation device may be configured to apply grease or another compound to a surface of the cable and/or inspect or measure the application. This device can be configured to dispense the compound around the insulation surface and transition region as shown. The operator can also spread the compound manually, or a combination of manual and automatic application. Another application method is to brush on using the rotary/spiral motion of the tool head. The device can also be used to inspect the surface to see if the compound was dispensed and if it was dispersed sufficiently in the correct areas.

Figure 20:
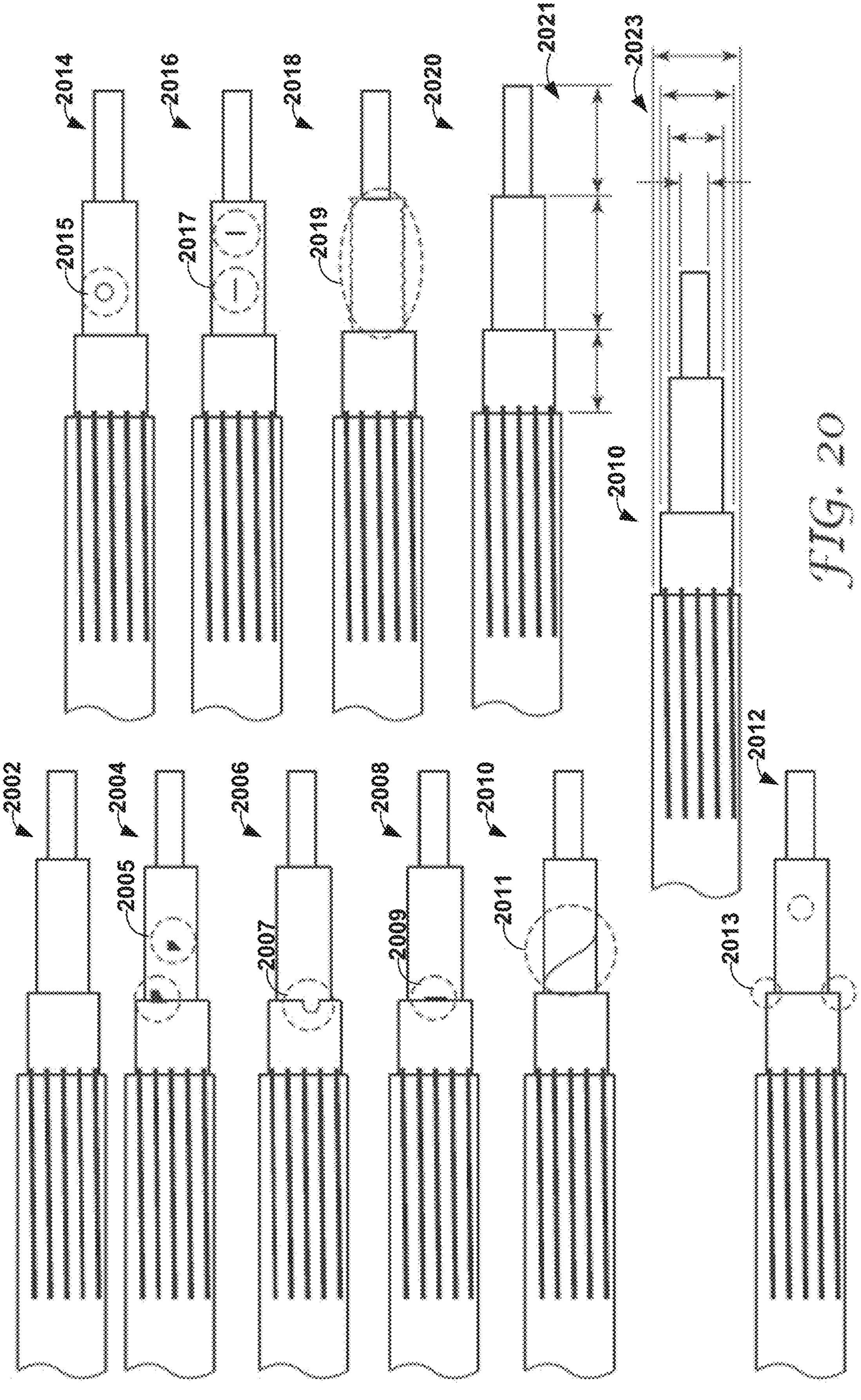
FIG. 20 is a conceptual diagram illustrating various examples of cutting defects in electrical power cables.

FIG. 20 is a conceptual diagram illustrating various examples of cutting defects in electrical power cables. Cable 2002 is substantially defect free, e.g., includes no detectable defects. Cable 2004 includes insulation screen 2005 remaining on the insulation. Cable 2006 includes an insulation screen cutback defect 2007. Cable 2008 includes an insulation surface cut 2009 at the transition to the insulation screen. Cable 2010 includes a gouge 2011 in the insulation. Cable 2012 includes missing or incomplete coverage of surface with grease or a similar compound 2013. Cable 2014 includes a cut in the insulation 2015. Cable 2016 includes a cut in the insulation 2015. Cable 2018 includes a rough insulation surface 2019. Cable 2020 includes improper cutback lengths 2021. Cable 2022 includes improper cutback diameters 2023. Cameras or other sensors can analyze the partially or fully completed prepped cable end for defects and dimensions. Once found, these defects can be corrected by a cable-preparation device.

Figure 21:
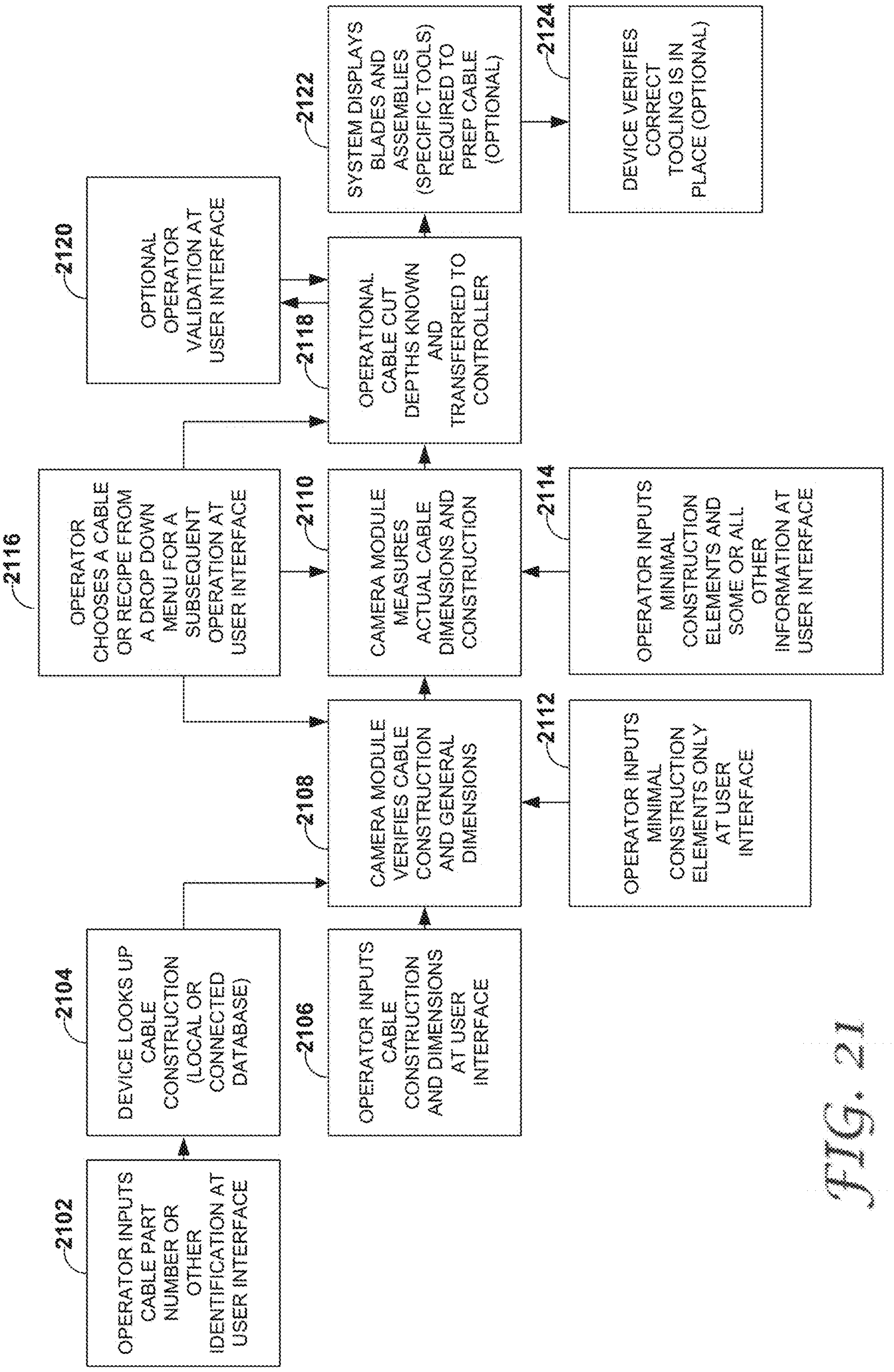
FIGS. 21 and 22 are flow charts illustrating example user input work flows for determining parameters of the cable preparation system for properly cutting a cable.
Figure 22:
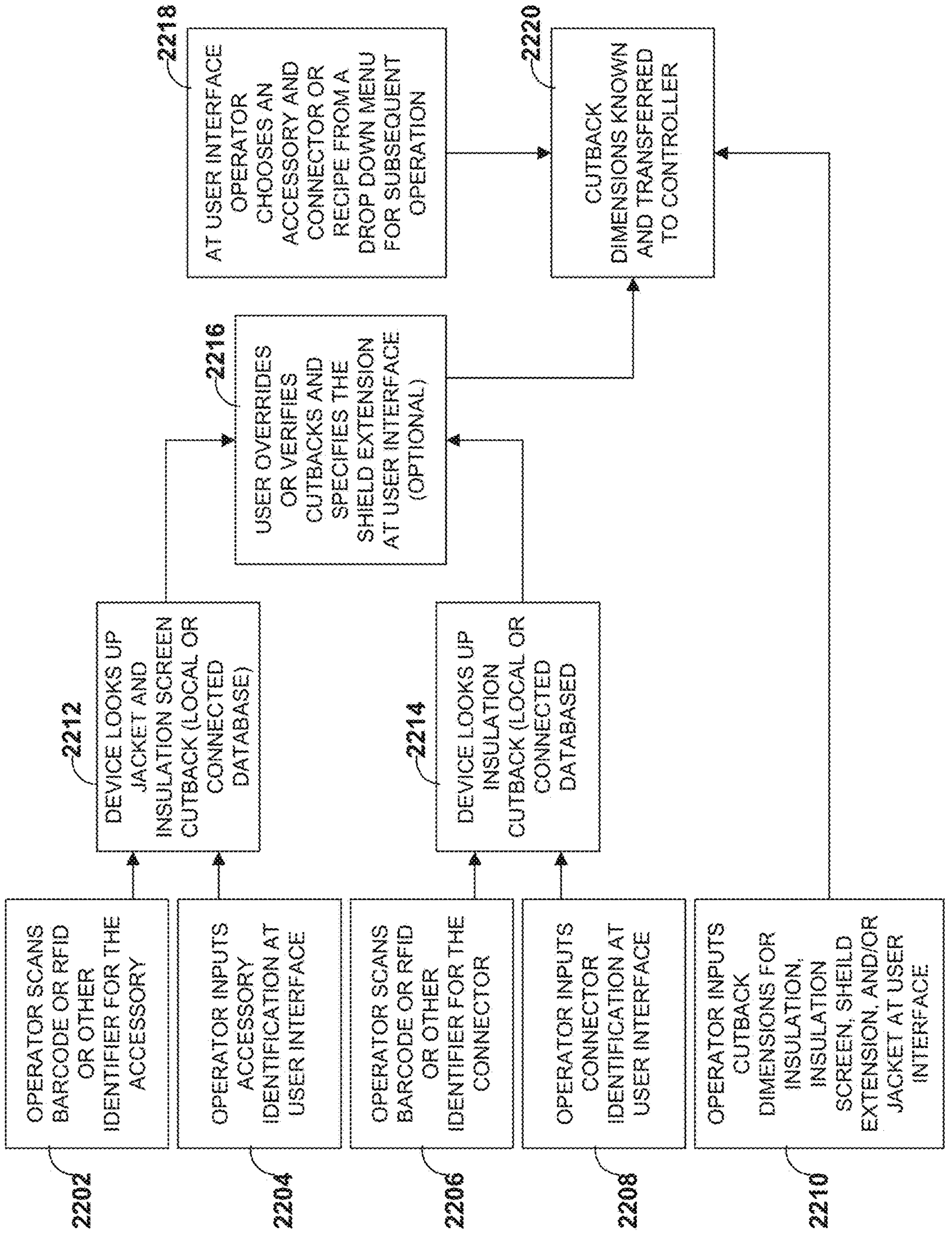

As discussed above, a user may input into a cable preparation system data to determine parameters of the cable preparation system for properly cutting a cable. FIGS. 21 and 22 are flow charts illustrating example user input work flows for determining parameters of the cable preparation system for properly cutting a cable. In some examples, an operator (user) may input a cable part number or other identification information at a user interface (2102). The cable preparation system, based on the inputted data, may look-up cable construction information (2104). Alternatively, the operator may input cable construction information and/or dimensions at the user interface (2106). In some examples, a camera or other component of cable preparation system may verify the inputted and/or determined data, such as cable construction (2108) or cable dimensions (2110). For example, a camera or laser measuring device may verify a diameter of the cable. Alternatively, an operator may input minimal cable construction information only (2112), or minimal cable construction information and some additional information (2114), at the user interface and the cable preparation system, e.g., via a camera or other component, may verify cable information or determine other missing information. Additionally, or alternatively, the operator may select a cable or a recipe from a drop down menu or the like (2116). Subsequently, the cable preparation system determines, based on the inputted and determined information, cable cut depths to a controller (2118), which the operator may validate in some example (2120). Then the cable preparation system may display to the operator the blades, rollers, or other tooling and/or setting required to properly cut the cable (2122). In some examples, the cable preparation system may be configured to verify the correct tooling is installed proper to cutting the cable (2124).

In some examples, when determining cable cutting parameters to be used with a selected cable accessory or cable connector, the cable preparation system may be configured to receive operator (user) input related to the cable accessory or cable connector. For example, a technique may include at least one of an operator scanning a barcode or RFID or other identifier of an accessory (2202) or a connector (2206), the operator inputting an identification at a user interface of the accessory (2204) or the connector (2208), or the operator inputting a cutback dimension for insulation, insulation screen, shield extension, and/or jacket based on an accessory or a connector at a user interface (2210). Based on information related to an accessory, the technique may include looking up, by the cable preparation system, a jacket and/or insulation screen cutback, such as, for example, using a local or connected database (2212). Based on information related to a connector, the technique may include looking up, by the cable preparation system, an insulation cutback, such as, for example, using a local or connected database (2214). In some examples, the technique may include overriding or verifying, by a user, cutbacks and specifying the shield extension at the user interface (2216). In some examples, an operator may choose, at a user interface, an accessory and/or connector or recipe from a drop-down menu or the like for subsequent operation (2218). After determining the accessory and/or connector, the technique includes dimensions known and transferred to a controller, e.g., for subsequently cutting a cable (2220).

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better case of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

What is claimed is:

1. A system comprising:
- an electrical cable preparation device configured to cut at least one layer of an electrical cable, comprising:
- at least one cutting tool; and
- at least one computing device configured to:
  - determine a target cutting distance of the at least one layer of the electrical cable, wherein the target cutting distance includes a target cutting depth or a target cutback distance;
  - control the electrical cable preparation device to cause the at least one cutting tool to cut the at least one layer of the electrical cable to the target cutting distance,
  - determine whether the at least one layer of the electrical cable includes a defect; and
  - perform at least one operation in response to determining that the at least one layer includes the defect;
  - wherein the computing device is configured to determine the defect by determining whether a roughness of the layer satisfies a threshold roughness.

2. The system of claim 1, wherein the at least one computing device is further configured to:
- receive identification information corresponding to the electrical cable, the identification information indicating a type of the electrical cable, and
- determine, based at least in part on the type of the electrical cable, the target cutting depth.

3. The system of claim 1, further comprising at least one camera configured to output image data representing one or more images of the electrical cable, wherein the at least one computing device is further configured to determine the target cutting depth based at least in part on the image data.

4. The system of claim 1, wherein the at least one layer of the electrical cable includes a first layer and a second layer, wherein the target cutting depth is a first target cutting depth, the first target cutting depth associated with the first layer, and wherein the at least one computing device is further configured to:
- determine a second target cutting depth, the second target cutting depth associated with the second layer of the electrical cable; and
- control the at least one cutting tool to cut the second layer of the electrical cable to the second target cutting depth.

5. The system of claim 1, wherein the at least one computing device is further configured to determine the target cutback distance based at least in part on at least one of a type of the electrical cable or a type of a cable accessory or connector configured to physically couple to the electrical cable.

6. The system of claim 1, wherein the at least one computing device is further configured to determine the target cutting distance based at least in part on data received from another computing device.

7. The system of claim 1, wherein the at least one computing device is further configured to output, for display, information indicative of at least one of the target cutting distance.

8. The system of claim 1, wherein the at least one computing device is configured to control the at least one cutting tool to taper a depth of the at least one layer.

9. The system of claim 1, wherein the at least one computing device is configured to control the at least one cutting tool to bevel an end of the at least one layer.

10. A system comprising:
- an electrical cable preparation device configured to cut at least one layer of an electrical cable, the electrical cable preparation device comprising at least one cutting tool; and
- at least one computing device configured to:
  - determine an actual cutting distance of the electrical cable preparation device;
  - determine whether the actual cutting distance satisfies a target cutting distance;
  - perform at least one first operation based on determining whether the actual cutting distance satisfies a target cutting distance,
  - wherein the actual cutting distance is an actual cutting depth and the target cutting distance is a target cutting depth or the actual cutting distance is an actual cutback length and the target cutting distance is a target cutback length;
  - determine whether the at least one layer of the electrical cable includes a defect; and
  - perform at least one second operation in response to determining that the at least one layer includes the defect;
  - wherein the computing device is configured to determine the defect by determining whether a roughness of the layer satisfies a threshold roughness.

11. The system of claim 10, further comprising at least one camera configured to output image data representing one or more images of the electrical cable, and wherein the at least one computing device is configured to determine whether the actual cutting distance satisfies the target cutting distance based at least in part on the image data.

12. The system of claim 10, wherein the at least one layer of the electrical cable includes a first layer and a second layer, wherein the first layer is a first color and the second layer is a second color different than the first color, and wherein the least one computing device is configured to determine that the actual cutting distance satisfies the target cutting distance based at least in part on a contrast between the first color and the second color.

13. The system of claim 10, wherein the actual cutting distance includes an actual cutting depth, wherein the target cutting distance includes a target cutting depth, and wherein the at least one computing device is configured to:
- position the at least one cutting tool at a first test cut position between a zero point position and a target cutback position;

cause the at least one cutting tool to cut to a first cutting depth;

determine whether the first cutting depth satisfies the target cutting depth;

responsive to determining that the first cutting depth does not satisfy the target cutting depth, adjust the at least one cutting tool to a second cutting depth that is greater than the first cutting depth;

position the at least one cutting tool at second test cut position between the first test cut position and a target cutback position;

cause the at least one cutting tool to cut to the second cutting depth;

determine whether the second cutting depth satisfies the target cutting depth;

responsive to determining that the second cutting depth satisfies the target cutting depth:

position the at least one cutting tool at the target cutback position;

set the target cutting depth to the second cutting depth; and cause the electrical cable preparation device to cut to the target cutting depth at the target cutback position.

14. The system of claim 10, wherein the computing device is further configured to determine the defect by at least one of:

determining whether a diameter of the layer satisfies a threshold diameter;

determining whether a cutback length of the layer satisfies a threshold cutback length associated with the layer;

determining whether a variance in a longitudinal boundary between a first layer and a second layer adjacent to the first layer satisfies a threshold variance;

determining whether the layer includes an gouges or cuts;

determining whether a surface of the layer is covered in with a compound; or determining whether a portion of the first layer remains within the region between a zero point and a location corresponding to a cutback distance associated with the first layer.

15. The system of claim 10, further comprising at least one camera configured to output image data representing one or more images of the electrical cable, wherein the at least one computing device is configured to determine whether the at least one layer of the electrical cable includes the defect based at least in part on the image data.

16. The system of claim 10, further comprising:

a base configured to support the at least one cutting tool, wherein the base is configured to move longitudinally about an axis of the electrical cable; and at least one clamp configured to hold the electrical cable stationary relative to the electrical cable preparation device.

17. The system of claim 10, wherein the at least one cutting tool includes a first cutting tool configured to cut one or more layers of the electrical cable and a second cutting tool configured to shave the one or more layers of the electrical cable.

18. A method performed by a system, the system comprising:

an electrical cable preparation device configured to cut at least one layer of an electrical cable, comprising: at least one cutting tool; and at least one computing device configured to:

determine a target cutting distance of the at least one layer of the electrical cable, wherein the target cutting distance includes a target cutting depth or a target cutback distance;

control the electrical cable preparation device to cause the at least one cutting tool to cut the at least one layer of the electrical cable to the target cutting distance;

determine whether the at least one layer of the electrical cable includes a defect; and perform at least one operation in response to determining that the at least one layer includes the defect;

wherein the computing device is configured to determine the defect by determining whether a roughness of the layer satisfies a threshold roughness;

wherein the method comprises:

determining, by the at least one computing device, a target cutting distance of the at least one layer of the electrical cable, wherein the target cutting distance includes a target cutting depth or a target cutback distance;

controlling, by the at least one computing device, the electrical cable preparation device to cause the at least one cutting tool to cut the at least one layer of the electrical cable to the target cutting distance; and performing the at least one operation in response to determining that the at least one layer includes the defect.

19. The method of claim 18, further comprising:

determining, by the at least one computing device, an actual cutting distance of a cut of at least one layer of an electrical cable cut by an electrical cable preparation device;

determining, by the at least one computing device, whether the actual cutting distance satisfies the target cutting distance; and performing, by the at least one computing device, at least one operation based on determining whether the actual cutting distance satisfies a target cutting distance, wherein the actual cutting distance is an actual cutting depth and the target cutting distance is a target cutting depth, or the actual cutting distance is an actual cutback length and the target cutting distance is a target cutback length.

* * * * *